US012782563B2

(12) United States Patent
Ito

(10) Patent No.: US 12,782,563 B2
(45) Date of Patent: Nov. 3, 2026

(54) LASER DISTANCE MEASURING DEVICE AND OBJECT DETECTION SYSTEM

(71) Applicant: DENSO WAVE INCORPORATED, Chita-gun (JP)

(72) Inventor: Kunihiko Ito, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 1061 days.

(21) Appl. No.: 17/245,897

(22) Filed: Apr. 30, 2021

(65) Prior Publication Data

US 2021/0341608 A1 Nov. 4, 2021

(30) Foreign Application Priority Data

Apr. 30, 2020 (JP) ................................ 2020-080313

(51) Int. Cl.

| | |
|---|---|
| ***G01S 17/00*** | (2020.01) |
| ***G01S 7/481*** | (2006.01) |
| ***G01S 7/497*** | (2006.01) |
| ***G01S 17/10*** | (2020.01) |

(52) U.S. Cl.

CPC ............ *G01S 17/10* (2013.01); *G01S 7/4814* (2013.01); *G01S 7/4817* (2013.01); *G01S 7/497* (2013.01)

(58) Field of Classification Search

USPC ........................................................ 356/5.01

See application file for complete search history.

(56) References Cited

U.S. PATENT DOCUMENTS

| | | | | |
|---|---|---|---|---|
| 8,420,998 | B2 * | 4/2013 | Iwasawa | G01S 17/66 250/203.1 |
| 2009/0108184 | A1 | 4/2009 | Wasawa | |
| 2017/0291540 | A1 * | 10/2017 | Caveney | B60Q 9/00 |
| 2018/0059248 | A1 * | 3/2018 | O'Keeffe | G01S 17/42 |
| 2018/0147062 | A1 * | 5/2018 | Ay | G06T 17/00 |
| 2018/0304885 | A1 * | 10/2018 | Kang | B60W 10/20 |
| 2019/0039627 | A1 * | 2/2019 | Yamamoto | B60W 50/082 |
| 2020/0031337 | A1 * | 1/2020 | Soltanian | G05D 1/0248 |
| 2020/0079363 | A1 * | 3/2020 | Frederick | G06V 10/147 |

FOREIGN PATENT DOCUMENTS

| | | | | |
|---|---|---|---|---|
| DE | 102009016146 A1 | 10/2010 | | |
| JP | 2000-046961 A | 2/2000 | | |
| JP | 2017-049230 A | 3/2017 | | |
| WO | WO-2010112098 A1 * | 10/2010 | | G01B 11/03 |

OTHER PUBLICATIONS

EP 3904903 A3 (Application EP 22171521) Search Opinion (Year: 2022).*

* cited by examiner

*Primary Examiner* — James R Hulka
(74) *Attorney, Agent, or Firm* — Oliff PLC

(57) ABSTRACT

A laser distance measuring device measures a distance to an object which is present in a target space and a direction of the object based on a time elapsed from when a laser beam is generated to when a reflected light is received. In addition, based on the measurement result, the laser distance measuring device determines presence or absence of a reference object provided at a predetermined position in the target space to thereby detect presence or absence of an object between the laser distance measuring device and the reference object.

7 Claims, 20 Drawing Sheets

FIRST DETERMINATION EXAMPLE

SECOND DETERMINATION EXAMPLE

LASER DISTANCE MEASURING DEVICE AND OBJECT DETECTION SYSTEM

CROSS-REFERENCE TO RELATED APPLICATION

This application is based on and claims the benefit of priority from earlier Japanese Patent Application No. 2020-080313 filed Apr. 30, 2020, the description of which is incorporated herein by reference.

BACKGROUND

Technical Field

The present invention relates to laser distance measuring devices for measuring a distance to an object which is present in a target space by using a laser beam.

Background Art

There have been known laser distance measuring devices that measure a distance to an object present in a target space by using a laser beam. Such laser distance measuring devices measure a distance to an object based on a time until the reflected light reflected by the object is received. For example, PTL 1 discloses detection of an object having a low reflectance by providing a threshold according to a level of the reflected light, through comparison made between light reflectances and a threshold which is set therefor.

CITATION LIST

Patent Literature

PTL 1: JP 2017-49230 A

However, there may be a case where reflected light fails to be received or reflected light having a low level is mixed with noise, in addition to the case of an object having a low reflectance, which makes it difficult to detect the object due to the measurement principle of the laser distance measuring device. For example, an object subjected to a surface treatment, such as a mirror surface, has a low reflectance. In addition, depending on a positional relationship between the object and the laser distance measuring device, the emitted laser beam may be reflected in a direction other than a direction toward the laser distance measuring device, which makes the detection difficult. Further, when an object has a curved surface, the emitted laser beam may be reflected in a direction deviated from a scan plane, which makes the detection difficult.

Examples of an object that is difficult to be detected include objects that can be a detection target in general use of the laser distance measuring device, for example, a vehicle having a surface coated with a coating.

SUMMARY

Thus, it is desired to provide a laser distance measuring device and an object detection system which are capable of detecting an object which is difficult to be detected using the prior art techniques.

According to a first aspect of the present disclosure, a laser distance measuring device includes: a laser beam generating unit that generates a laser beam; a reflection unit that emits the laser beam generated by the laser beam generating unit toward a target space (i.e., a space to be targeted, examined, or scanned) while changing a reflection direction; a drive unit that drives the reflection unit to change the reflection direction; a light receiving unit that receives reflected light reflected by an object which is present in the target space; a distance measurement unit that measures a distance and a direction to the object present in the target space based on a time elapsed from when the laser beam is generated by the laser beam generating unit to when the reflected light is received by the light receiving unit; a reference object determination unit that determines whether a reference object disposed at a predetermined position in the target space is detected or not based on a measurement result by the distance measurement unit; and an object determination unit that determines presence or absence of an object between the laser distance measuring device and the reference object based on a determination result by the reference object determination unit.

As described above, due to the measurement principle of the laser distance measuring device, there may be an object which is difficult to be detected. In addition, depending on the assumed target space, there may be a case where distance measurement is not necessarily required. For example, there may be a case where it is only required to detect the presence or absence of an intruder, or, it is only required to detect the presence or absence of an object crossing a railroad crossing when the target space is a railroad crossing, for example. It should be noted this does not mean that measurement of distance is unnecessary, but means that detection of the presence or absence of an object is prioritized in these situations.

Therefore, the laser distance measuring device has a configuration that can determine whether an object is present at a specific position in the target space, that is, a position corresponding to the reference angular range. Accordingly, the laser distance measuring device can detect the presence or absence of an object even when it is difficult to measure the distance to the object due to the surface treatment or surface shape of the object. Thus, it is possible to detect an object that is difficult to be detected.

According to a second aspect of the present disclosure, a laser distance measuring device includes: a laser beam generating unit that generates a laser beam; a reflection unit that emits the laser beam generated by the laser beam generating unit toward a target space while changing a reflection direction; a drive unit that drives the reflection unit to change the reflection direction; a light receiving unit that receives reflected light reflected by an object which is present in the target space; a distance measurement unit that measures a distance and a direction to the object present in the target space based on a time elapsed from when the laser beam is generated by the laser beam generating unit to when the reflected light is received by the light receiving unit; a reference object determination unit that determines whether a reference object disposed at a predetermined position in the target space is detected or not based on a measurement result by the distance measurement unit; and an object determination unit that determines presence or absence of an object between the laser distance measuring device and the reference object based on a determination result by the reference object determination unit.

With this configuration, the laser distance measuring device can detect, in the first place, at least the presence or absence of an object even when it is difficult to measure the distance to the object due to the surface treatment or surface shape of the object.

The target space of the laser distance measuring device is assumed to be, for example, a place in which a moving direction is limited, such as a one-way road or an access road to an expressway, or a place where entry is prohibited. In such a case, it may only be required to detect an intruder or wrong-way driving of a vehicle, for example, even though the distance to the object cannot be measured.

Therefore, the laser distance measuring device further includes a moving direction determination unit that determines a moving direction of the object based on a determination result by the object determination unit, and detects the presence or absence of an object between the laser distance measuring device and each of the plurality of reference objects provided in the target space to determine the moving direction of the object based on the order in which the presence of the object has been determined. Accordingly, the laser distance measuring device can determine the moving direction of the object and detect, for example, an intruder in a place where entry is prohibited or wrong-way driving in a one-way road or an access road to an expressway.

According to a third aspect of the present disclosure, a laser distance measuring device includes: a laser beam generating unit that generates a laser beam; a reflection unit that emits the laser beam generated by the laser beam generating unit toward a target space while changing a reflection direction; a drive unit that drives the reflection unit to change the reflection direction; a light receiving unit that receives reflected light reflected by an object which is present in the target space; a distance measurement unit that measures a distance and a direction to the object present in the target space based on a time elapsed from when the laser beam is generated by the laser beam generating unit to when the reflected light is received by the light receiving unit; a reference object determination unit that determines whether a reference object disposed at a predetermined position in the target space is detected or not based on a measurement result by the distance measurement unit; and an object determination unit that determines presence or absence of an object between the laser distance measuring device and the reference object based on a determination result by the reference object determination unit.

With this configuration, the laser distance measuring device can detect, in the first place, at least the presence or absence of an object even when it is difficult to measure the distance to the object due to the surface treatment or surface shape of the object.

The target space of the laser distance measuring device is assumed to be, for example, a railroad crossing, which is a place where entry is prohibited when a train passes. In such a case, it may only be required to identify the presence of a person for taking a safety measure such as sounding an alarm, even though the distance to the object cannot be measured.

Therefore, the laser distance measuring device further includes a person identification unit that identifies a person based on a determination result by the object determination unit. The laser distance measuring device determines the presence or absence of an object between the laser distance measuring device and each of the plurality of the reference objects provided adjacent to each other, and, when it is determined that an object is present, identifies whether the object is a person or not based on the presence or absence of the object between the reference objects adjacent to each other. This enables detection of presence of a person or the like.

According to a fourth aspect of the present disclosure, a laser distance measuring device includes: a laser beam generating unit that generates a laser beam; a reflection unit that emits the laser beam generated by the laser beam generating unit toward a target space while changing a reflection direction; a drive unit that drives the reflection unit to change the reflection direction; a light receiving unit that receives reflected light reflected by an object which is present in the target space; a distance measurement unit that measures a distance and a direction to the object present in the target space based on a time elapsed from when the laser beam is generated by the laser beam generating unit to when the reflected light is received by the light receiving unit; a reference object determination unit that determines whether a reference object disposed at a predetermined position in the target space is detected or not based on a measurement result by the distance measurement unit; and an object determination unit that determines presence or absence of an object between the laser distance measuring device and the reference object based on a determination result by the reference object determination unit.

With this configuration, the laser distance measuring device can detect, in the first place, at least the presence or absence of an object even when it is difficult to measure the distance to the object due to the surface treatment or surface shape of the object.

It is assumed that the laser distance measuring device is installed outdoors and the reference object is also installed outdoors. In this case, it is assumed that dust or dirt may be attached to the laser distance measuring device or the reference object, physical damage may occur to the laser distance measuring device or the reference object, or deviation in orientation or position of the laser distance measuring device or the reference object may occur due to an external force applied.

This may cause failure in detection of the reference object. Accordingly, it may be erroneously determined that an object is present. Further, besides an erroneous determination, a situation of being stuck in a railroad crossing, for example, is also assumed.

Therefore, the laser distance measuring device further includes an abnormality determination unit that determines the presence or absence of abnormality, and determines that there is an abnormality when presence of the object is continuously determined for a period of time exceeding a predetermined abnormality determination time. This reduces occurrence of erroneous determination, and detection of abnormalities such as a failure or dirt of the reference object, positional deviation by which the laser distance measuring device or the reference object is changed in orientation, or being stuck on a railroad crossing.

The remaining advantageous configurations and effects can be clarified by the following descriptions which are made with the accompanying drawings.

DESCRIPTION OF THE EMBODIMENTS

Figure 1:
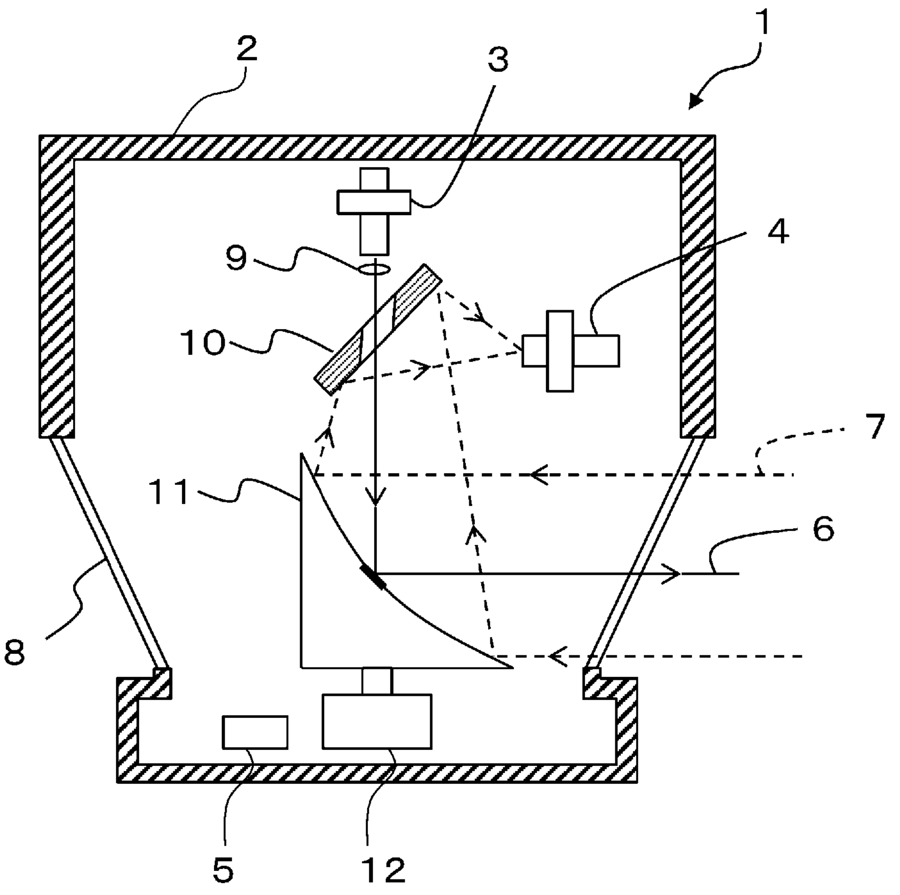
FIG. 1 is a diagram schematically illustrating a configuration of a laser distance measuring device according to a first embodiment.

A plurality of embodiments according to the present invention will be described below with reference to the drawings. Components substantially common to the respective embodiments are denoted by the same reference numerals.

First Embodiment

The following description will be given of a first embodiment. As shown in FIG. 1, a laser distance measuring device 1 according to the present embodiment includes a laser beam generating unit 3, a light receiving unit 4, and a control circuit unit 5, which are disposed in a housing 2. The laser distance measuring device 1 is configured to emit a laser beam toward an object which is present in a target space (i.e., a space to be targeted, examined, or scanned) and receive a laser beam reflected by the object to thereby detect a distance to the object present in the target space and a direction of the object. In FIG. 1, the emitted laser beam is referred to as emitted light 6, and the reflected laser beam is referred to as reflected light 7.

Specifically, the housing 2 is formed in a substantially cylindrical shape, and a wall of the housing 2 has a window 8 extending in a circumferential direction. The window 8 is made of a transparent glass or acrylic material so that the emitted light 6 passes through toward the target space. The laser beam generating unit 3 is formed of, for example, a laser diode and configured to emit a pulsed laser beam. The light receiving unit 4 is formed of, for example, a photodiode and configured to detect the reflected light 7 reflected by the object and convert it into an electrical signal.

A collimating lens 9 and a perforated mirror 10 are disposed on the optical axis of the laser beam generating unit 3. The collimating lens 9 converts a laser beam generated by the laser beam generating unit 3 into parallel light. The perforated mirror 10 is formed in a plate shape and has a through hole formed at a center thereof. The perforated mirror 10 is disposed at a predetermined angle relative to the optical axis of the laser beam generating unit 3 with the through hole positioned on the optical axis. A lower surface of the perforated mirror 10 is a reflecting surface, which reflects light toward the light receiving unit 4.

A rotating mirror 11 is provided as a reflection unit under the perforated mirror 10. The rotating mirror 11 rotates about a center axis extending in the optical axis direction of the laser beam generating unit 3. The rotating mirror 11 has a concave mirror whose focal point is set on the center axis, and reflects the laser beam toward the outside. Thus, the emitted light 6 is emitted from the laser distance measuring device 1. In addition, the reflection unit causes the reflected light 7 from the outside to be reflected in a direction toward the perforated mirror 10.

The rotating mirror 11 is rotationally driven by a drive unit 12. The drive unit 12 is composed of, for example, a motor and an encoder, and drives the reflection unit to rotate to thereby change the emitting direction of the emitted light 6 in a stepwise manner. Thus, the emitted light 6 is emitted from the laser distance measuring device 1 in a fan shape in plan view toward the target space. The drive unit 12 drives the reflection unit to rotate at a speed of several to tens of times per second.

Figure 2:
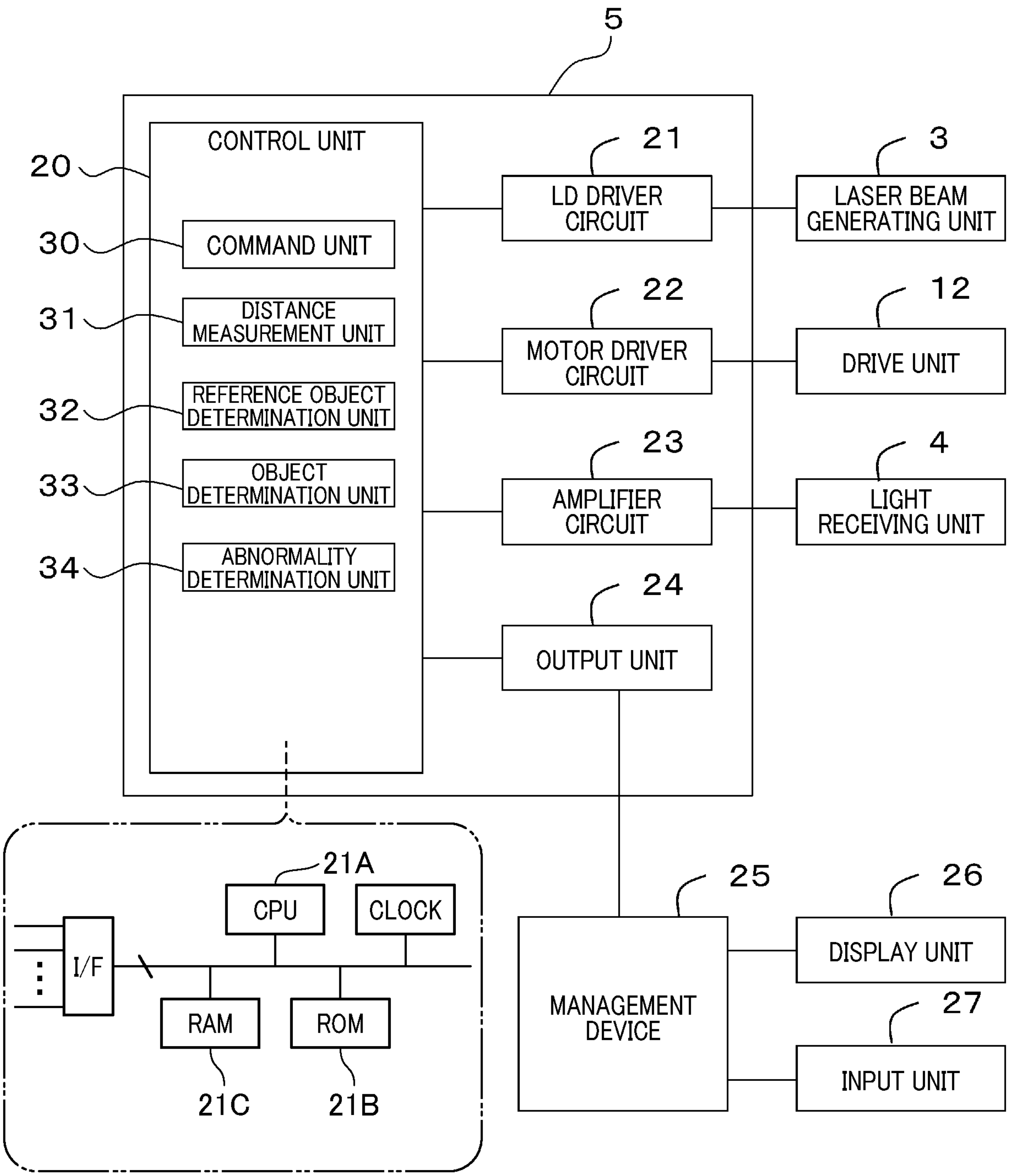
FIG. 2 is a diagram schematically illustrating an electric configuration of a laser distance measuring device.

As shown in FIG. 2, the control circuit unit 5 includes a control unit 20 composed of, for example, a microcomputer CP having a CPU (Central Processing Unit) 21A, a ROM (Read-Only Memory) 21B, a (Random Access Memory) RAM 21C, and the like, an LD driver circuit 21 that drives the laser beam generating unit 3, a motor driver circuit 22 that drives the drive unit 12, an amplifier circuit 23 that amplifies a signal from the light receiving unit 4, and an output circuit 24 that outputs various types of signals and performs communication. Any type of computer can be adopted in the control circuit unit 5, provided that the following software steps described later can be performed.

The control unit 20 controls the entire laser distance measuring device 1 by executing programs stored in the ROM and the like. Specifically, the control unit 20, i.e., the CPU 21A, generates and outputs a light emission command to cause the laser beam generating unit 3 to generate a pulsed laser beam. The light emission command includes information indicating a drive voltage value so that the LD driver circuit 21 causes the laser beam generating unit 3 to generate a laser beam at the drive voltage value determined by the light emission command.

The control unit 20, i.e., the CPU 21A, outputs a motor drive signal for instructing the motor driver circuit 22 to rotate the drive unit 12 at a predetermined speed. Further, the control unit 20 obtains a detected value of an encoder of the drive unit 12 to thereby obtain a rotation position and a rotation speed of the reflection unit, that is, the rotating mirror 11. In addition, the control unit 20 obtains the reflected light 7 received by the light receiving unit 4 as an electrical signal amplified by the amplifier circuit 23.

The output circuit 24 outputs various data and signals as electrical signals to an external management device 25. The management device 25 is configured by a personal computer or a workstation, and includes a display unit 26 such as a display and an input unit 27 such as a keyboard or a mouse. The display unit 26 functions as a notification unit that notifies an administrator of an object detection result, an abnormality detection result, and the like.

The control unit 20 functionally includes a command unit 30, a distance measurement unit 31, a reference object determination unit 32, an object determination unit 33, an abnormality determination unit 34, and the like. In the present embodiment, these units are functionally implemented as software by the control unit 20 executing the programs previously stored in the ROM 21B.

The distance measurement unit 31 measures a distance to an object which is present in a target space based on the time elapsed from when a laser beam is generated by the laser beam generating unit 3 to when the reflected light 7 is received by the light receiving unit 4, and measures a direction of the object based on the rotation position of the rotating mirror 11. When the reflected light 7 is not detected within a maximum standby time, which is a time estimated until the reflected light 7 reflected from an outer edge of the detection range is received, it is determined that no object is present.

Figure 3:
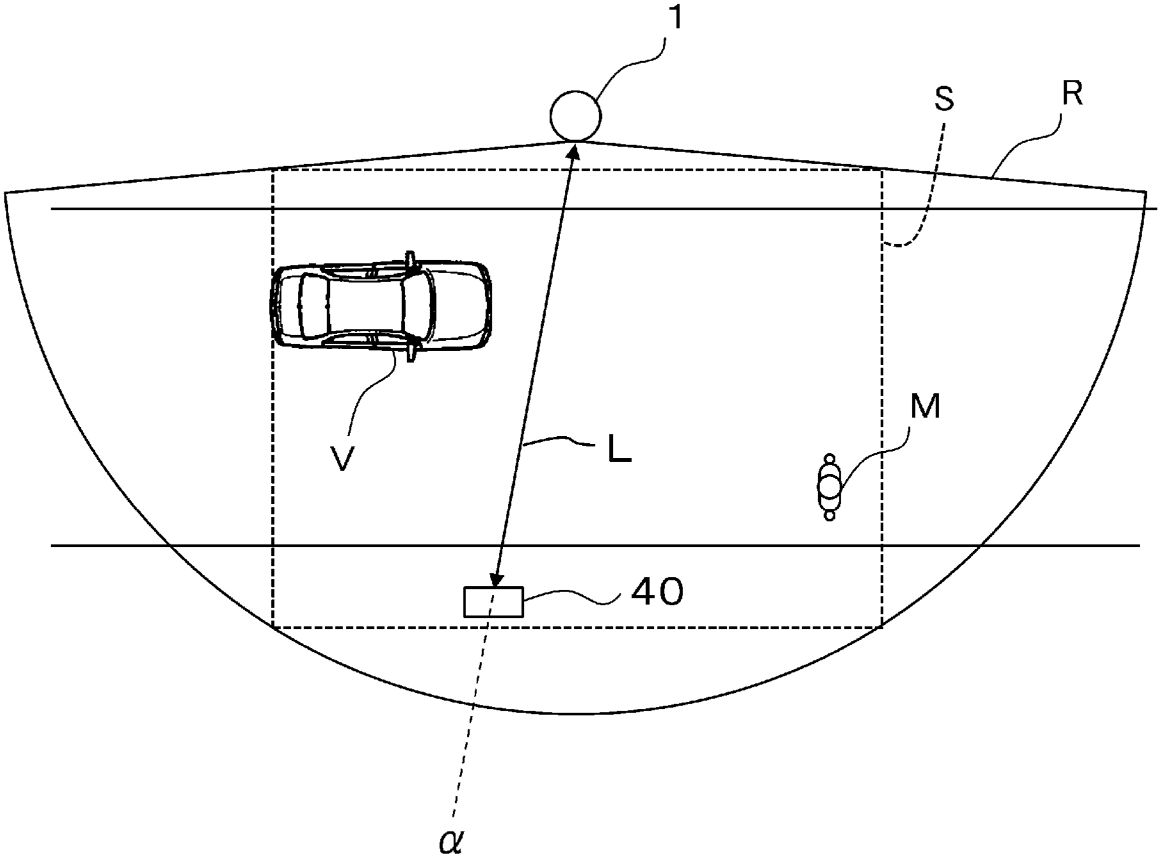
FIG. 3 is a diagram schematically illustrating an installation of a laser distance measuring device.

The reference object determination unit 32 determines whether a reference object 40 provided at a predetermined position in the target space, for example, as shown in FIG. 3, can be detected based on the measurement result by the distance measurement unit 31. The details of the reference object determination unit 32 will be described later. The object determination unit 33 determines whether or not an object is present between itself and the reference object 40 based on the determination result by the reference object determination unit 32. The details of the object determination unit 33 will be described later. In other words, the object determination unit 33 determines whether or not an object is present between the laser distance measuring device 1 and the reference object 40. When the presence of an object is continuously determined for a period of time exceeding a predetermined abnormality determination time, the abnormality determination unit 4 determines that there is an abnormality. The details of the abnormality determination unit 4 will be described later.

The laser distance measuring device 1 having the above configuration is installed as shown in FIG. 3 in plan view such that a target space (S), which is a target for detecting an object, is included within a detection range (R), which is an emission range of the emitted light 6, more specifically, an emission range of the emitted light 6 capable of detecting a distance and a direction of the object. In the present embodiment, a railroad crossing is taken as an example of the target space. That is, the laser distance measuring device 1 is provided to detect an object such as a person (M) or a vehicle (V) moving in the target space such as a railroad crossing.

In the target space, the reference object 40 is provided at a predetermined position. The reference object 40 is provided in a state in which it reflects the emitted light 6 toward the laser distance measuring device 1 with a fixed positional relationship relative to the laser distance measuring device 1. Accordingly, when no object is present between the laser distance measuring device 1 and the reference object 40, the laser distance measuring device 1 can always detect the reference object 40. The reference object 40 can be implemented by, for example, providing a mirror surface directly facing the laser distance measuring device 1, or a retroreflective member that reflects incident light mainly in the incidence direction.

In the present embodiment, the reference object 40 is provided in a predetermined reference angular range (α) as viewed from the laser distance measuring device 1, spaced by a predetermined reference distance (L). The reference angular range basically corresponds to a scan angle of the laser distance measuring device 1. In this specification, the reference angular range is represented as a for convenience of description since the value of the angle varies depending on which position is taken as a reference.

The diameter of the emitted light 6 increases as the distance from the laser distance measuring device 1 increases. Accordingly, when a desired range size can be detected by the emitted light 6 at a single scan angle, the reference angular range corresponds to a single scan angle.

Figure 4:
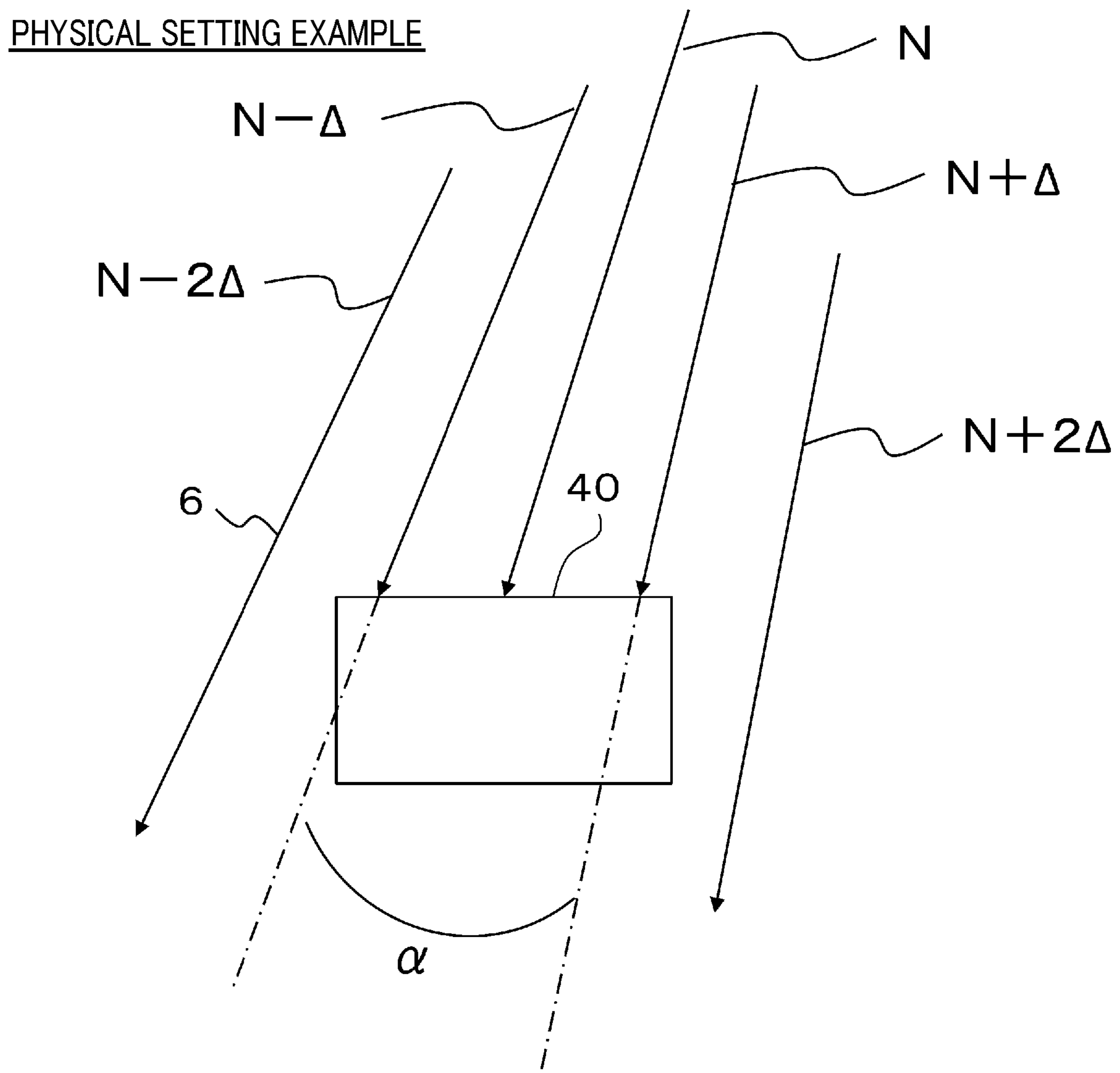
FIG. 4 is a diagram schematically illustrating a first example setting of a reference object and a reference angular range.

However, the reference angular range may not necessarily correspond to a single scan angle. When the range desired to be detected is large in size, the reference angular range can be set across a plurality of scan angles such as a scan angle (N−Δ), a scan angle (N), and a scan angle (N+Δ), for example, as shown in FIG. 4. Therefore, in this specification, both the reference angular range corresponding to a single scan angle and the reference angular range corresponding to a plurality of scan angles are collectively referred to as a reference angular range. Further, N represents an angle, and Δ represents an angular resolution. That is, the reference angular range can be set according to the size of the detection target.

In addition, the reference angular range can also be set according to the physical size of the reference object 40. For example, FIG. 4 illustrates a physical setting example. As shown in the figure, when the reference object 40 has a size extending across the scan angles (N−Δ to N+Δ), the reference angular range can be set to the scan angles (N−Δ to N+Δ).

Figure 5:
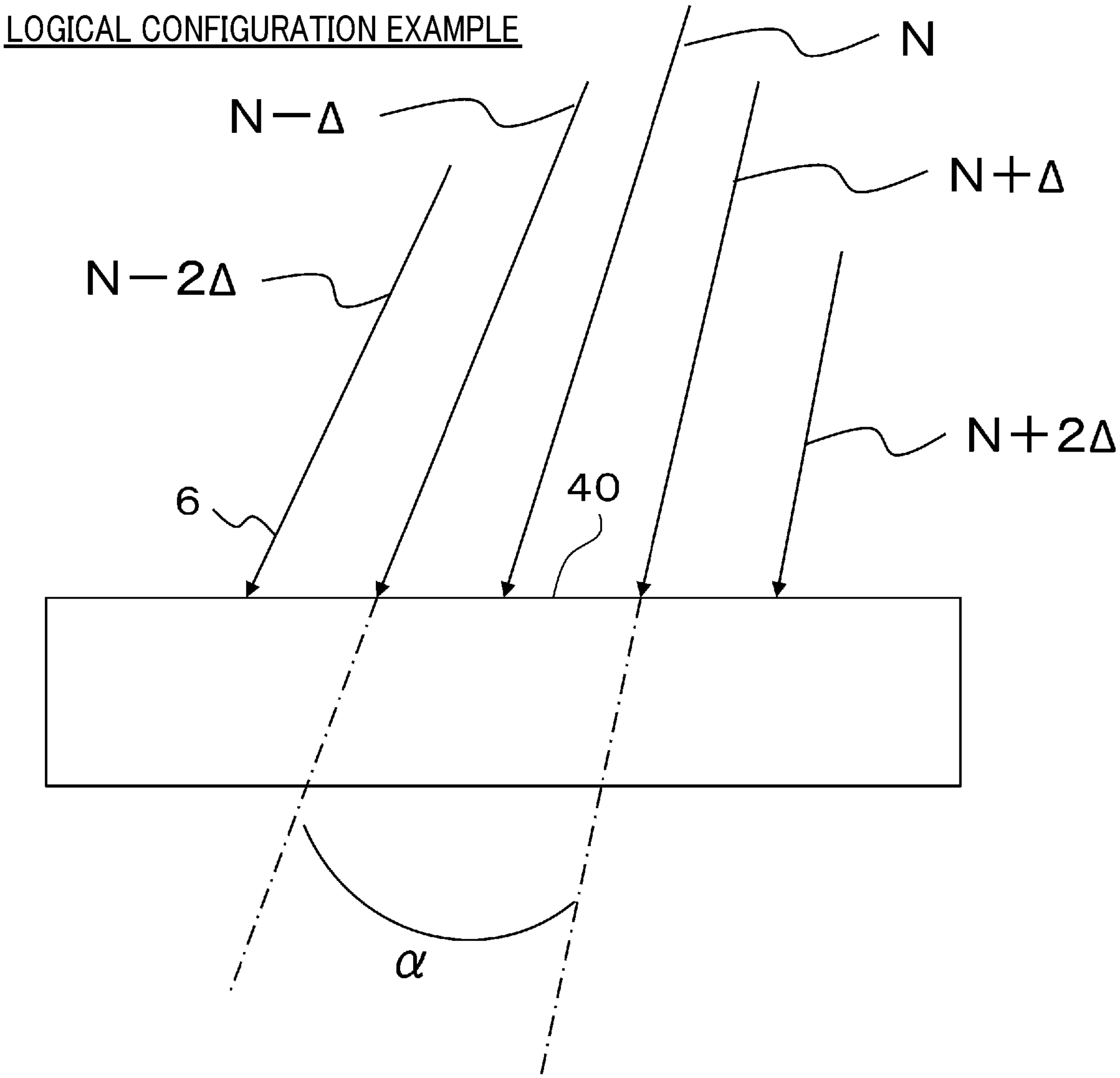
FIG. 5 is a diagram schematically illustrating a second example setting of a reference object and a reference angular range.

Alternatively, the reference angular range can be set logically rather than according to the physical size of the reference object 40. For example, FIG. 5 illustrates a logical configuration example. As shown in the figure, when the reference object 40 has a size extending across the scan angles (N−2Δ to N+2Δ), the reference angular range can be logically set to the scan angles (N−Δ to N+Δ) by extracting only the data for the ranges of the scan angles (N−Δ to N+Δ).

Further, since the emission range of the emitted light 6 and the diameter thereof can be obtained by calculation, it is also possible to provide a reference object 40 with a size and a position corresponding to those of the object to be detected to thereby set the range in which the reference object 40 can be detected as a reference angular range.

Next, effects of the above configuration will be described.

Figure 6:
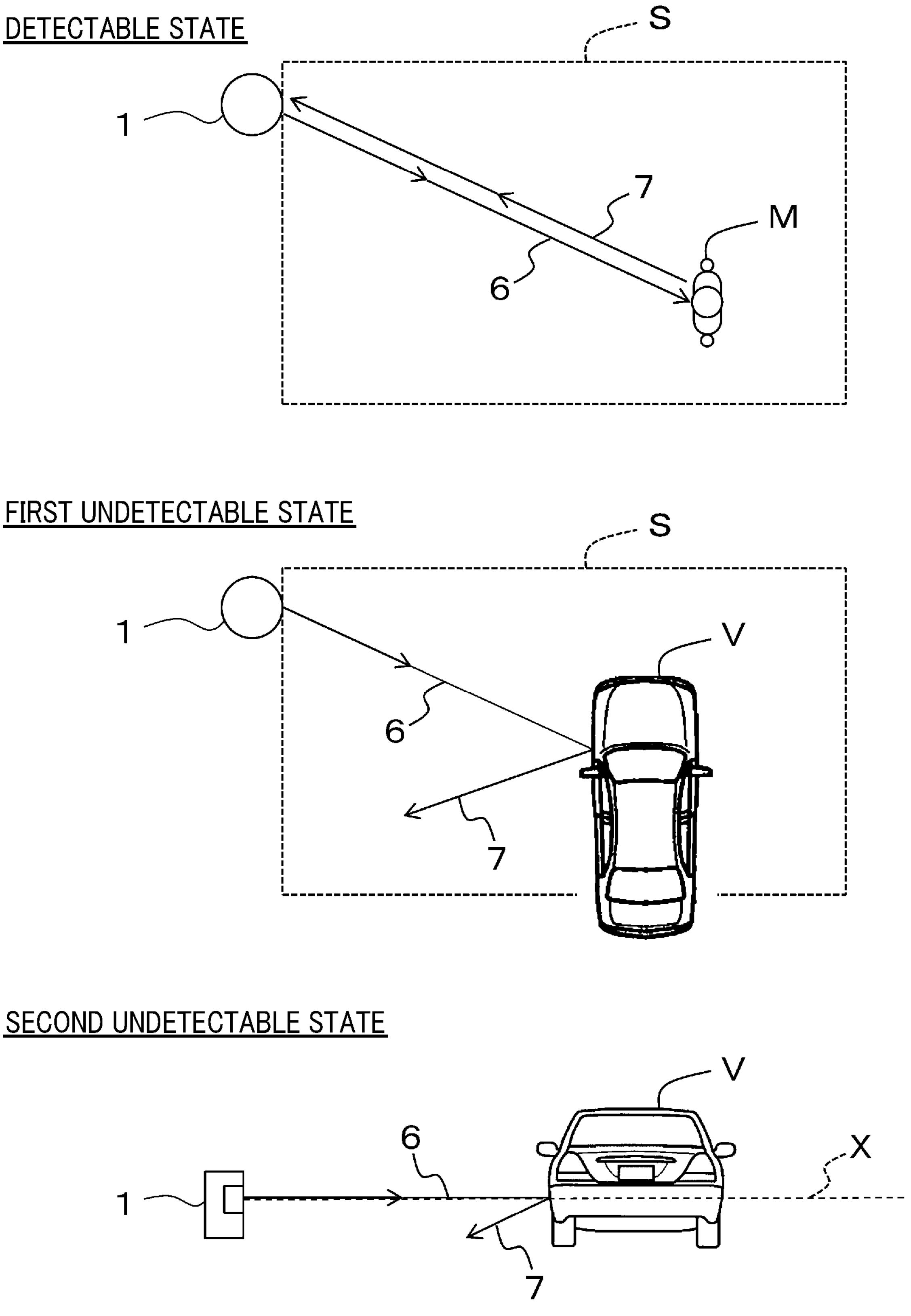
FIG. 6 is a diagram schematically illustrating detection by a laser distance measuring device.
Figure 8:
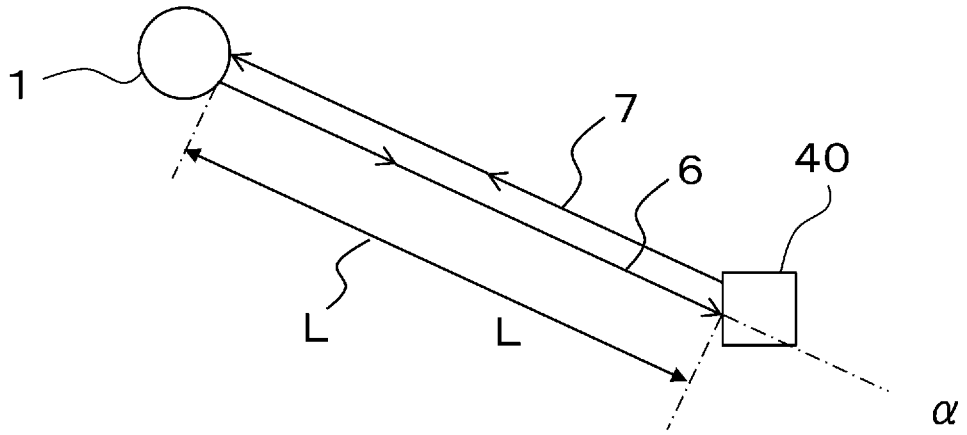
FIG. 8 is a diagram schematically illustrating determination for the presence or absence of an object.
Figure 8:
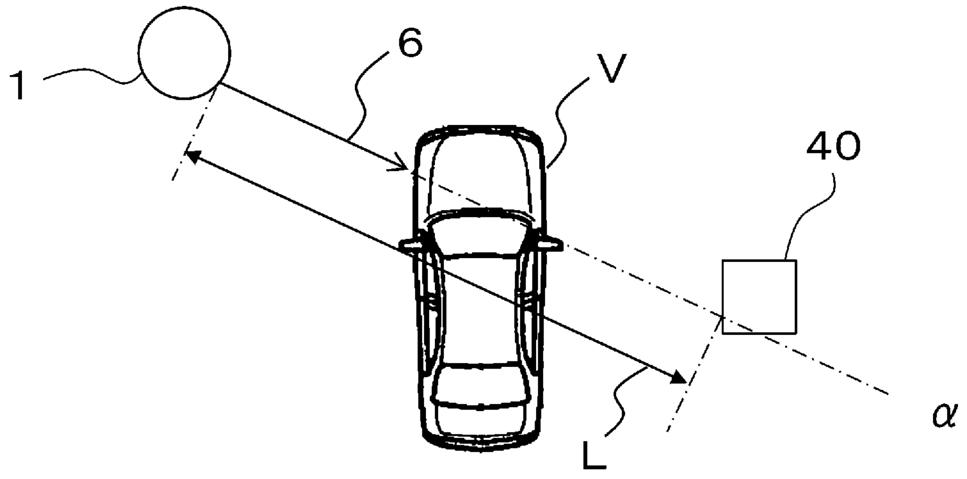

As described above, the laser distance measuring device 1 receives the reflected light 7 of the emitted light 6 emitted into the target space to thereby detect a distance and a direction of the object. In this process, when a person is present in the target space in a detectable state as shown in FIG. 6, the emitted light 6 is scattered by clothes and part of the emitted light 6 is reflected as the reflected light 7 toward the laser distance measuring device 1. Thus, the person can be detected as an object. In FIGS. 6 and 8, the path of the emitted light 6 is separately illustrated for ease of understanding.

However, as described above, there may be a case where the reflected light 7 fails to be received or the reflected light 7 having a low level is mixed with noise, which makes it difficult to detect the object due to the measurement principle of the laser distance measuring device 1. For example, a first undetectable state is shown in FIG. 6, in which an object is a black vehicle or a vehicle having a surface coated with a coating. In this case, the surface serving as a mirror surface reflects the emitted light 6 in a direction other than a direction toward the laser distance measuring device 1, which makes the detection difficult. Further, a second undetectable state is shown in FIG. 6, in which a surface of the vehicle is curved. In this case, the emitted light 6 is reflected in a direction deviated from a scan plane X, which makes the detection difficult.

In addition, depending on the assumed target space, there may be a case where distance measurement is not necessarily required. For example, there may be a case where it is only required to detect the presence or absence of an intruder, or in the present embodiment in which the assumed target space is a railroad crossing, it is only required to detect the presence or absence of an object crossing a railroad crossing. It should be noted this does not mean that measurement of distance is unnecessary, but means that detection of the presence or absence of an object is prioritized in these situations.

Figure 7:
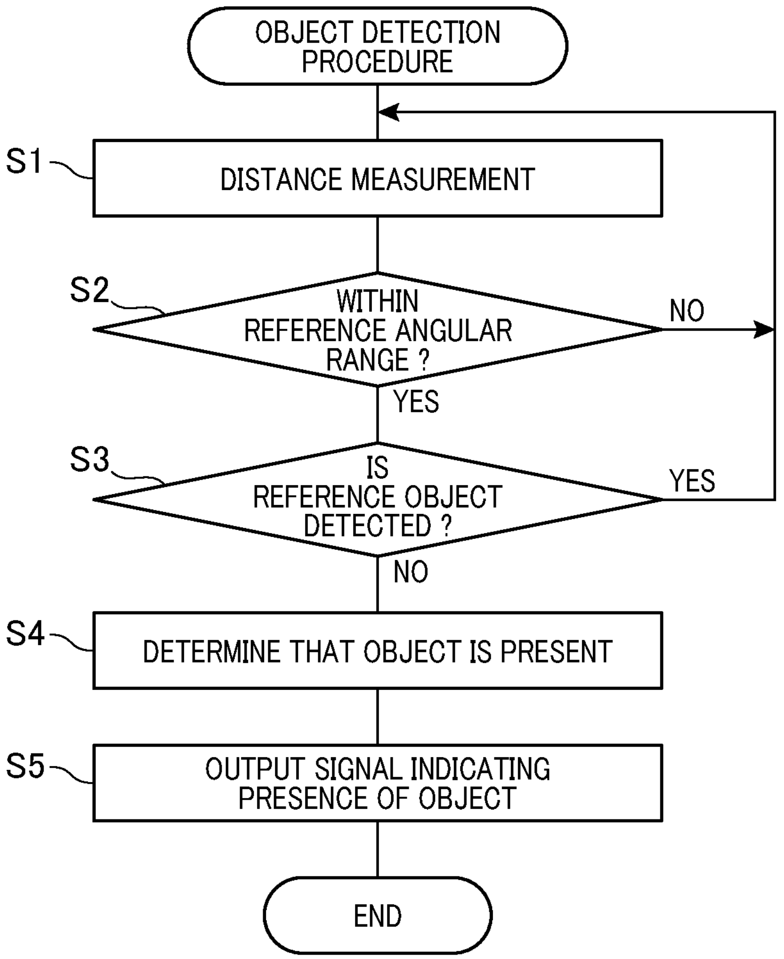
FIG. 7 is a flowchart of object detection.

Therefore, in the present embodiment, the laser distance measuring device is provided with a reference object determination unit 32 and an object determination unit 33 in order to mainly detect the presence or absence of an object during object detection shown in FIG. 7. In the object detection shown in FIG. 7, the control unit 20, the distance measurement unit 31, and the like are also involved. Therefore, for simplicity of description, the following description will be given focusing on the laser distance measuring device.

In step S1 of the object detection shown in FIG. 7, the laser distance measuring device performs distance measurement. Step S1 is performed for each scan angle by the distance measurement unit 31. Subsequently, in step S2, the laser distance measuring device determines whether a current scan angle corresponds to a reference angular range. When the current scan angle is determined as not corresponding to the reference angular range (NO in step S2), the laser distance measuring device performs distance measurement at a next scan angle.

On the other hand, when the current scan angle is determined as corresponding to the reference angular range (YES in step S2), the laser distance measuring device determines whether or not a reference object 40 is detected in step S3. Step S3 is performed by the reference object determination unit 32.

In this step, the laser distance measuring device 1 determines that the reference object 40 has been detected when an object has been detected at a reference angular range (α) and a predetermined reference distance (L) based on the calculation result by the distance measurement unit 31. In addition, when the reference angular range extends across a plurality of scan angles, detection results for an object at respective scan angles included in the reference angular range are stored, and, when an object is detected at all the scan angles included in the reference angular range, it is determined that the reference object 40 has been detected.

For example, a first determination example is shown in FIG. 8, in which no other object is present between the laser distance measuring device 1 and the reference object 40. In this case, the emitted light 6 is reflected by the reference object 40. Accordingly, the object (in this case, the reference object 40) is detected at the reference angular range (α) and a predetermined reference distance (L). As the reference object 40 is detected, that is, no other object is detected between the laser distance measuring device 1 and the reference object 40 (YES in step S3), the process returns to step 51, and the laser distance measuring device 1 performs distance measurement at a next scan angle.

On the other hand, a second determination example is shown in FIG. 8, in which a vehicle is present between the laser distance measuring device 1 and the reference object 40. In this case, the emitted light 6 is blocked by the vehicle. Accordingly, regardless of whether the reflected light 7 reflected by the vehicle can be detected, no object is detected at the reference angular range (α) and a predetermined reference distance (L) by the laser distance measuring device 1. Accordingly, the laser distance measuring device 1 determines that the reference object 40 cannot be detected. This situation indicates that other object is present between the laser distance measuring device 1 and the reference object 40.

Therefore, when the result of step S3 is NO, the laser distance measuring device 1 determines that an object is present in step S4. Then, the laser distance measuring device 1 outputs a signal indicating the presence of an object to the management device 25 in step S5, and ends the procedure. The procedure is described as ended for ease of understanding of the flow of the object detection. However, in practice, the process returns to step S1 after the signal is outputted, and next distance measurement is performed.

Thus, the laser distance measuring device 1 determines the presence or absence of an object.

The reference object 40 is installed in a target space which is a space to be detected by the laser distance measuring device 1. Such a target space is assumed to be outdoors, and the laser distance measuring device is also assumed to be installed outdoors. In this case, when dirt or dust is attached to the reference object 40, or damage occurs to the reference object 40, the emitted light 6 may fail to be reflected, which may lead to determination that an object is present.

Figure 9:
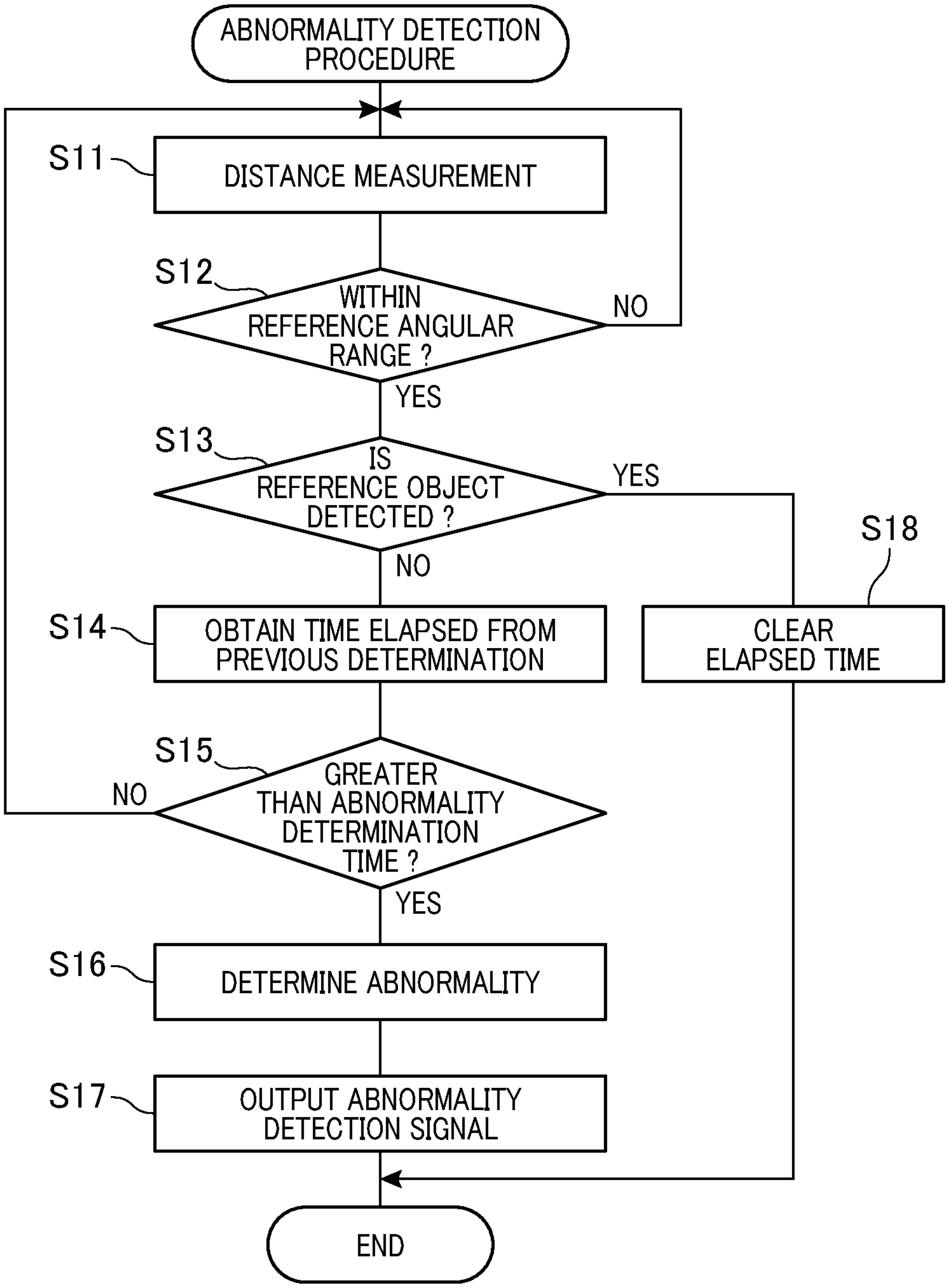
FIG. 9 is a flowchart of abnormality determination.

Therefore, as shown in FIG. 9, the laser distance measuring device 1 performs abnormality determination. This procedure is performed by the abnormality determination unit 34. Since this includes steps partially common to the object detection shown in FIG. 7, it can also be implemented as a subroutine that is called when the result of step S3 in the object detection shown in FIG. 7 is NO, or when an object detection signal is outputted in step S4.

In step S11 of the abnormality determination shown in FIG. 9, the laser distance measuring device 1 performs distance measurement. In step S12, it determines whether a current scan angle corresponds to the reference angular range. When the laser distance measuring device 1 determines that the current scan angle does not correspond to the reference angular range (NO in step S12), the process returns to step S11.

On the other hand, when the laser distance measuring device 1 determines that the current scan angle corresponds to the reference angular range (YES in step S12), it determines whether or not the reference object 40 is detected. The steps so far are performed basically in the same manner as in the object detection shown in FIG. 7.

Then, when the laser distance measuring device 1 detects the reference object 40 (YES in step 13), it clears the elapsed time in step S18 and ends the procedure. As will be described below, the elapsed time is a time elapsed from when it was determined that the reference object 40 was not detected, and is used to determine the presence or absence of abnormality. That is, when the laser distance measuring device 1 detects the reference object 40, it determines that there is no abnormality and clears the elapsed time in step S18.

On the other hand, when the laser distance measuring device 1 does not detect the reference object 40 (NO in step 13), the process proceeds to step S14. In step 14, the laser distance measuring device 1 obtains an elapsed time from when it was determined that the reference object 40 was not detected. In this step, counting of the elapsed time starts since the elapsed time has been cleared when the reference object 40 was detected in the previous determination.

Then, in step S15, the laser distance measuring device 1 determines whether the elapsed time exceeds a predetermined abnormality determination time. When the elapsed time does not exceed the abnormality determination time (NO in step S15), the process returns to step S11, and next distance measurement is performed. In this case, the elapsed time is continuously counted without being cleared, and the cumulative value of the elapsed time is used for the next and subsequent determinations. The abnormality determination time can be set as appropriate. In the present embodiment, in which a railroad crossing is assumed, the abnormality determination time can be set to, for example, approximately one minute, considering a typical speed of a person or a vehicle which is an object assumed to move across the railroad crossing. Alternatively, the abnormality determination time can be defined as a time required for the number of times of scanning, for example, 5 or 10 times.

When the elapsed time exceeds the abnormality determination time after several times of determinations (YES in step S15), the laser distance measuring device 1 determines that there is an abnormality in step S16. In step S17, the laser distance measuring device 1 outputs an abnormality detection signal and ends the procedure.

Examples of the abnormality include, for example, deviation in orientation of the laser distance measuring device 1 due to an external force applied, deviation in orientation or position or damage to the reference object 40 due to an external force applied, dust or dirt being attached to the reference object 40, and a malfunction of the laser distance measuring device 1 itself. However, it is difficult to specify the cause of abnormality only by determining the presence or absence of the object. Accordingly, the laser distance measuring device 1 outputs an abnormality detection signal notifying that the abnormality has been detected.

As described above, the laser distance measuring device 1 detects the presence or absence of an object based on whether or not the reference object 40 provided at a predetermined reference angular range is detected.

According to the laser distance measuring device 1 described above, the following effects can be achieved.

The laser distance measuring device 1 measures a distance to an object which is present in a target space and a direction of the object based on the time elapsed from when a laser beam is generated to when the reflected light 7 is received. In addition, the laser distance measuring device 1 determines the presence or absence of the reference object 40 at a predetermined position in the target space based on the measurement result. Accordingly, the laser distance measuring device 1 can determine whether an object is present between the laser distance measuring device 1 and the reference object 40 even if distance measurement cannot be performed due to the object being a low reflection object or a surface shape of the object. Thus, it is possible to detect an object that is difficult to be detected.

Furthermore, the laser distance measuring device 1 performs determination based on whether the object has been detected, and determines that there is an abnormality when the presence of an object is continuously determined for a period of time exceeding a predetermined abnormality determination time. This enables detection of abnormalities such as being stuck on a railroad crossing, a failure or dirt of the reference object 40, or positional deviation by which the laser distance measuring device 1 or the reference object 40 is changed in orientation.

In the examples described in the present embodiment, determination is performed for each scan angle. However, it is also possible to store detection results for an object at respective scan angles, and determine the moving direction when a single scan operation is completed.

Second Embodiment

The following description will be given of a second embodiment. A laser distance measuring device 1 according to the present embodiment has a configuration which is basically the same as that of the first embodiment. As with the first embodiment, the laser distance measuring device 1 detects the presence or absence of an object based on whether or not a reference object 40 provided at a predetermined reference angular range is detected. In the present embodiment, object detection according to the first embodiment is extended to determine a moving direction of an object.

In the present embodiment and thereafter, the components which are the same or equivalent as or to those of the first embodiment will be provided by using the same reference numbers, for simplifying the descriptions.

Figure 10:
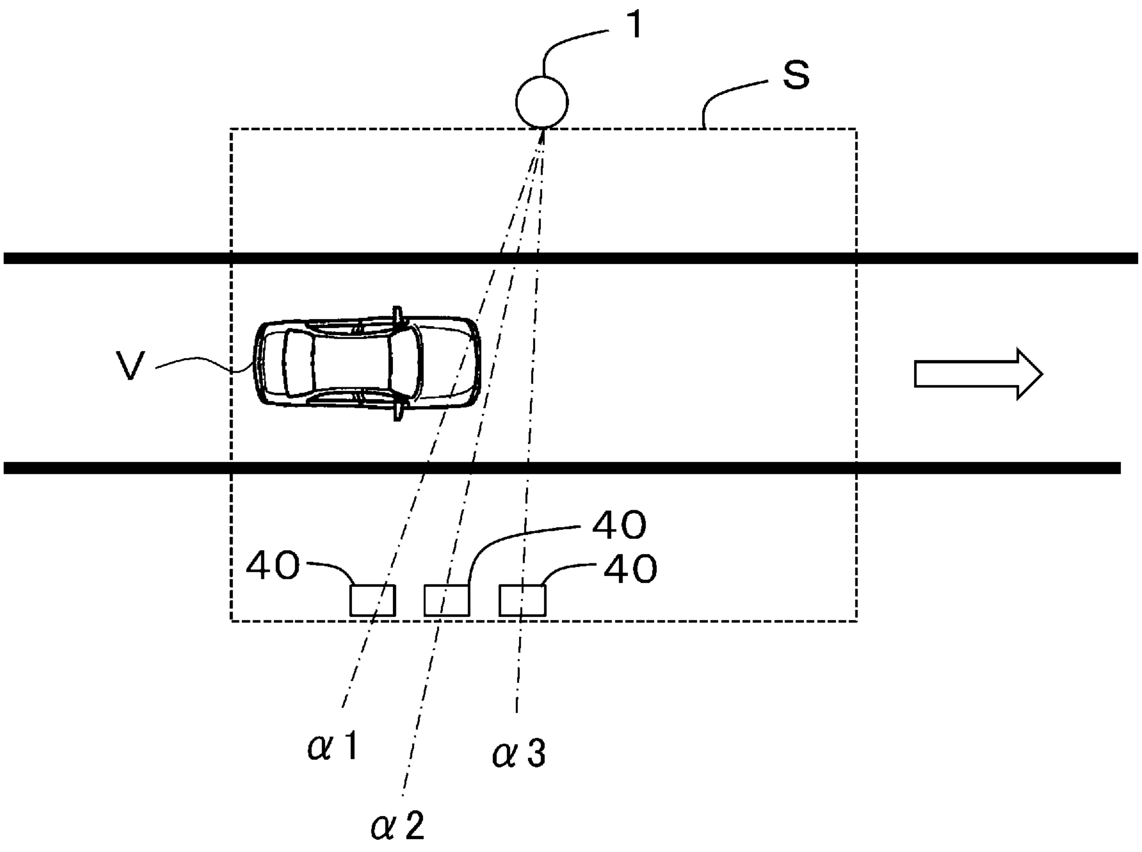
FIG. 10 is a diagram schematically illustrating an installation of a laser distance measuring device according to a second embodiment.

In the present embodiment, a target space (S) is assumed to be a place in which a traveling direction is indicated by an arrow as shown in FIG. 10, for example, a one-way road or an access road to an expressway. In the target space, a plurality of reference objects 40 for determining the moving direction are provided. According to the present embodiment, at least three reference objects 40 are provided at the reference angular ranges of $\alpha$1, $\alpha$2, and $\alpha$3, respectively. In this case, for detection of wrong-way driving of a vehicle in a one-way road or an access road to an expressway, the reference angular ranges $\alpha$1, $\alpha$2, and $\alpha$3 are set such that all the reference objects 40 may be simultaneously covered by a typical sized vehicle such as an automobile when the vehicle passes by the reference objects 40.

However, in determination of the moving direction, a plurality of reference objects 40, that is, two or more reference objects 40 may be provided. Each reference object 40 can be provided for each reference angular range. Alternatively, it is possible to provide one reference object 40 having a size capable of logically setting a plurality of reference angular ranges as described in the first embodiment, or both the one having a size capable of setting one reference angular range and the one having a size capable of setting a plurality of reference angular ranges.

Further, providing the plurality of reference objects 40 has an advantage in ease of installation since each reference object 40 can be reduced in size. On the other hand, when the reference object 40 is provided by applying, for example, a retroreflective tape to an existing wall surface or the like, there is an advantage that an installation space is not required.

Figure 11:
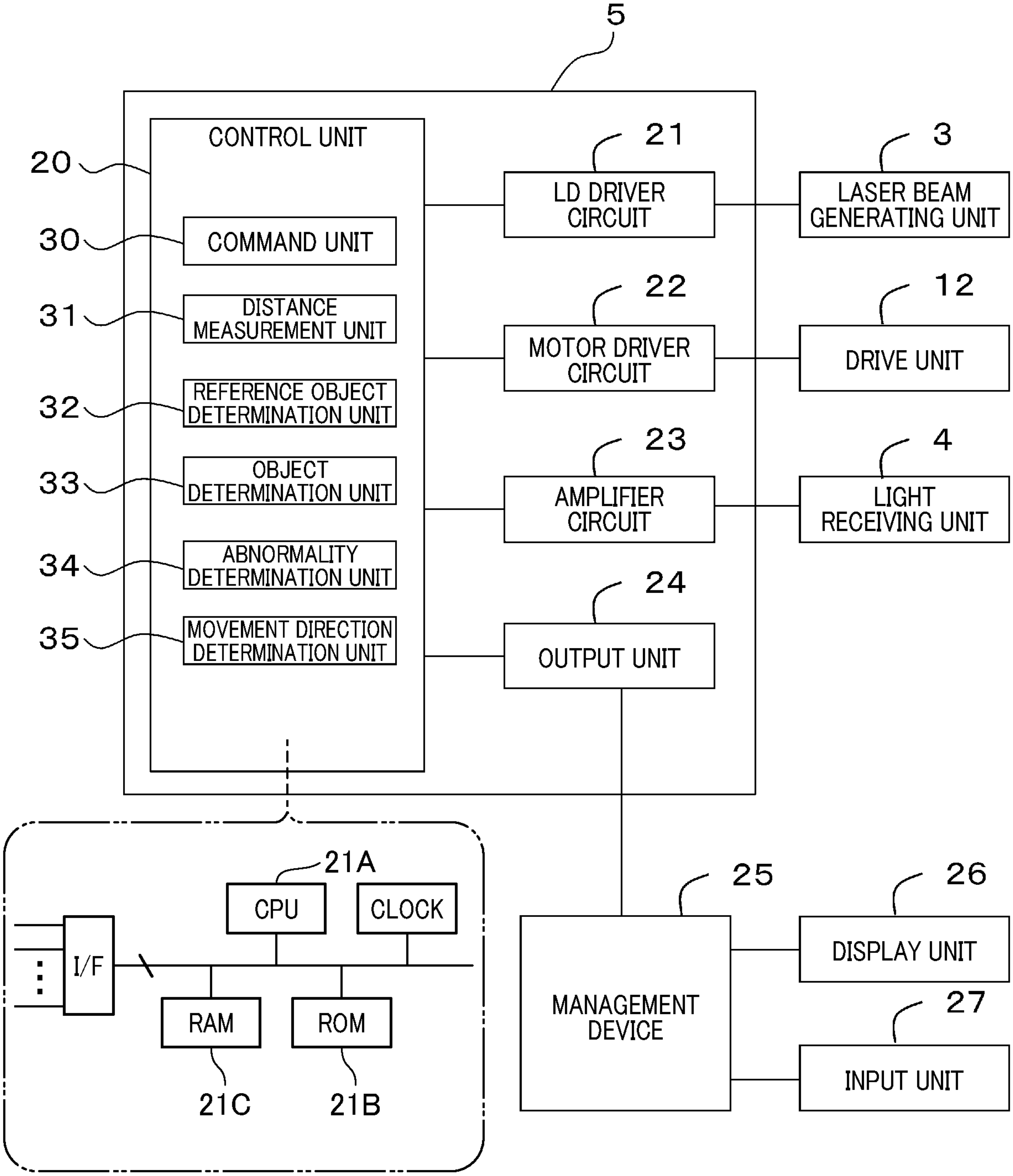
FIG. 11 is a diagram schematically illustrating an electric configuration of a laser distance measuring device.

As shown in FIG. 11, the laser distance measuring device 1 includes a moving direction determination unit 35. The moving direction determination unit 35 is functionally implemented as software by the control unit 20, practically, the CPU 21A as explained, executing the programs, and determines the moving direction of the object based on the determination result of the object determination unit 33.

Figure 12:
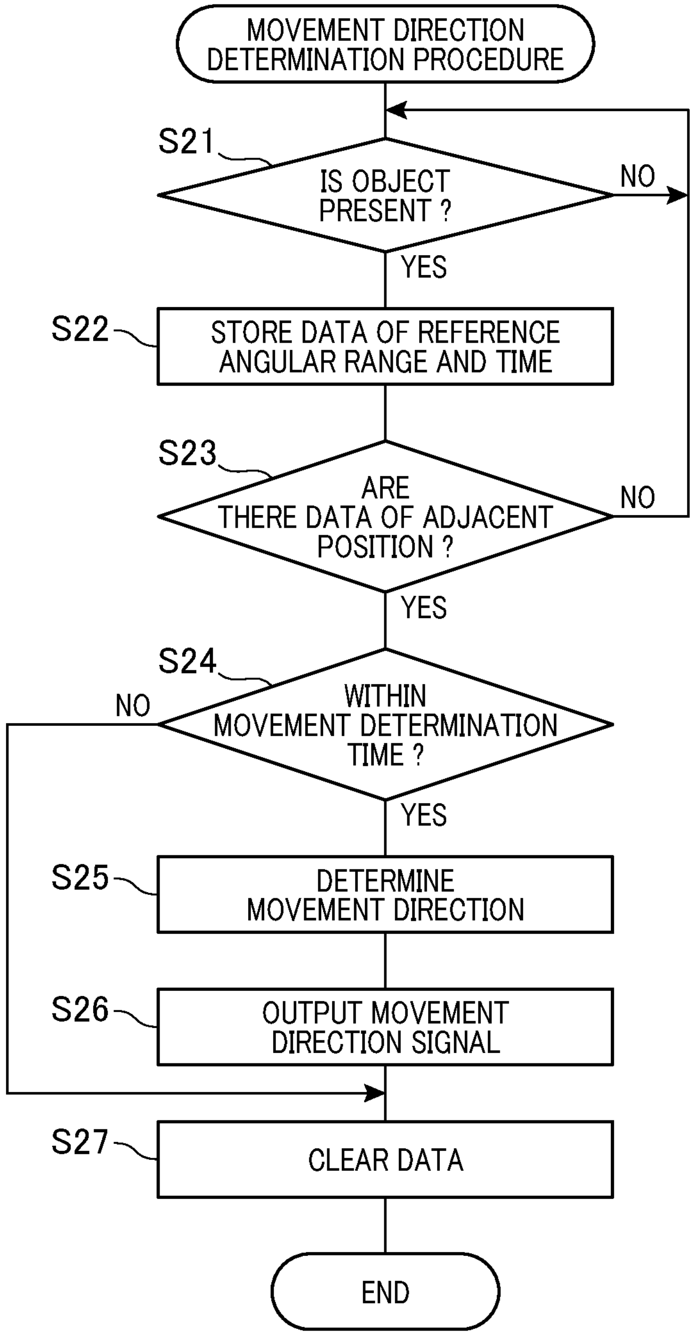
FIG. 12 is a flowchart of moving direction determination.

As shown in FIG. 12, the laser distance measuring device 1 performs moving direction determination. For simplicity of description, FIG. 12 omits the procedure up to determination of the presence or absence of an object, but the presence or absence of an object can be determined in the same flow as that in the object detection shown in FIG. 7. Therefore, the moving direction detection can also be implemented as a subroutine that is called when the result of step S3 in the object detection shown in FIG. 7 is NO, or when an object detection signal is outputted in step S4.

In step S21, the laser distance measuring device 1 determines the presence or absence of an object. When it is determined that no object is present (NO in step S21), the process returns to step S21, and determination is repeated.

Figure 13:
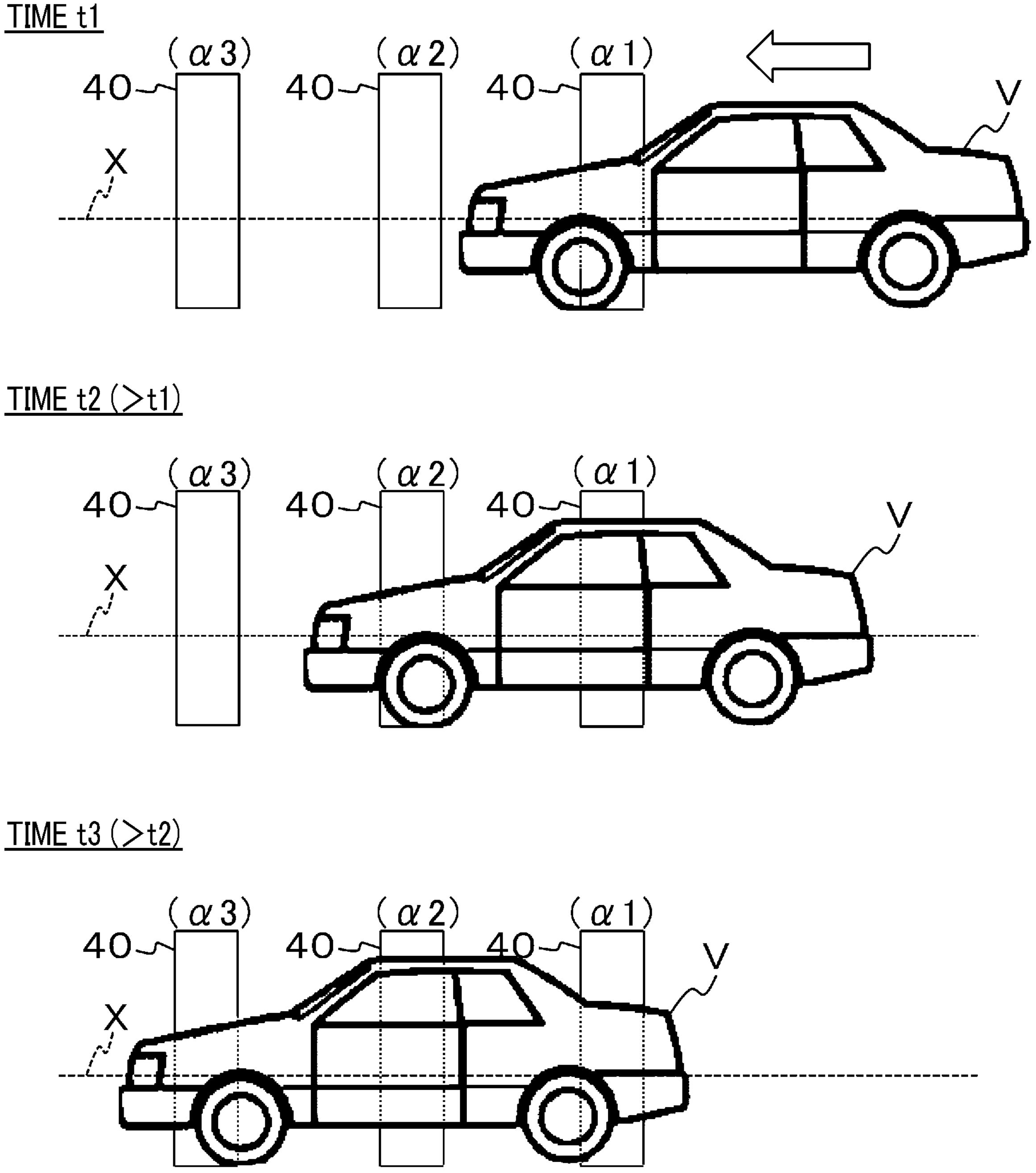
FIG. 13 is a time series view schematically illustrating determination of the presence of an object.

On the other hand, when the laser distance measuring device 1 determines that an object is present (YES in step S21), it stores the reference angular range at which the object is determined as being present and the time of the determination in step S22. For example, FIG. 13 shows a time t1, in which an object is detected at a position of α1 at the time t1. In this case, the laser distance measuring device 1 stores data for the reference angular range as α1 and the time when the object is first detected as t1. The data are stored in a RAM 21C, for example.

Then, in step S23, the laser distance measuring device 1 determines whether or not there are data for the adjacent position. That is, the laser distance measuring device 1 determines whether or not data for α2, which is a reference angular range adjacent to α1, are stored. In FIG. 13, since the vehicle moves in a direction from α1 to α2, no data for a position of α2 are stored. Accordingly, the laser distance measuring device 1 determines that there is no data for the adjacent position (NO in step S23), and the process returns to step S21.

FIG. 13 further shows a time t2, in which an object is detected at the position of α2 at the time t2 while an object is detected at the position of α1 at the time t1 (YES in step S21). In this case, the laser distance measuring device 1 stores data for the reference angular range as α2 and the time when the object is first detected as t2 in step S22.

In this case, since the data for α1 have been stored (YES in step S23), the laser distance measuring device 1 determines whether a difference in time is within a movement determination time in step S24. The movement determination time can be set according to an assumed speed of the object, for example, according to a time required for a vehicle traveling at approximately 40 km/h to pass by the reference object 40. For detection of a person, the movement determination time can be set according to a walking speed of a person.

In step S24, the laser distance measuring device 1 determines whether a difference between the time t1 at which the object is detected at the position of α1 and the time t2 at which the object is detected at the position of α2 is within the movement determination time. That is, in step S24, the laser distance measuring device 1 verifies whether the moving direction can be correctively determined.

When the laser distance measuring device 1 determines that the difference in time is not within the movement determination time (NO in step S24), it clears the data in step S28 and ends the procedure. Although the procedure is described as ended for simplicity of description, the process returns to step S21 in practice after the data are cleared, and determination whether or not an object is present is repeated.

On the other hand, when the laser distance measuring device 1 determines that the difference in time is within the movement determination time (YES in step S24), it determines the moving direction in step S25. In this case, since the laser distance measuring device 1 has determined that an object is present at the position of α2 in a state in which the data for α1 are stored, the laser distance measuring device 1 determines that the object is moving in a direction from α1 to α2 based on the order in which the presence of the object has been determined.

Then, in step S26, the laser distance measuring device 1 outputs a moving direction signal indicating the determined moving direction. In this case, the moving direction signal may be a signal for simply notifying the moving direction. In addition, when wrong-way driving has been determined from the moving direction, the laser distance measuring device 1 can output a wrong-way driving signal for notifying wrong-way driving or an abnormality detection signal by combining the step with the abnormality determination described in the first embodiment to thereby recognize the wrong-way driving as an abnormality, or activate a warning lamp or the like provided at a position in the wrong-way direction.

Then, in step S27, the laser distance measuring device 1 clears the stored data and ends the procedure. Although the procedure is described as ended for simplicity of description, the process returns to step S21 in practice after the data are cleared, and determination whether or not an object is present is repeated. FIG. 13 further shows a time t3, in which an object is detected at a position of α3 at the time t3. In this case, a moving direction signal is not redundantly outputted since the stored data have been cleared. That is, the moving direction can be correctly determined.

As described above, the laser distance measuring device 1 detects the presence or absence of an object based on whether the reference object 40 is detected, and determines the moving direction of the detected object based on the determination result for the presence or absence of the object.

According to the laser distance measuring device 1 described above, the following effects can be achieved.

The laser distance measuring device 1 measures a distance to an object which is present in a target space and a direction of the object based on the time elapsed from when a laser beam is generated to when the reflected light 7 is received. In addition, the laser distance measuring device 1 determines the presence or absence of the reference object 40 at a predetermined position in the target space based on the measurement result. The laser distance measuring device 1 determines whether the reference object 40 provided at a predetermined position can be detected based on the determination result, and determines the moving direction of the object based on the determination result.

In the target space, a plurality of reference objects 40 are provided. The laser distance measuring device 1 determines the presence or absence of the object between the laser distance measuring device 1 and each reference object 40, and determines the moving direction of the object based on the order in which the presence of the object has been determined.

With this configuration, the laser distance measuring device 1 enables detection of an object which is difficult to be detected, and determination of the moving direction of the object. In addition, the laser distance measuring device 1 enables detection of the traveling direction of a person or a vehicle in a railroad crossing or the like and detection of wrong-way driving in a one-way road or an access road to an expressway or the like.

Further, the moving direction determination can be combined with the abnormality determination described in the first embodiment. This enables detection of abnormalities such as being stuck on a railroad crossing.

In the examples described in the present embodiment, determination is performed for each scan angle. However, it is also possible to store detection results for an object at respective scan angles, and determine the moving direction when a single scan operation is completed.

When an object is detected at another reference angular range which is not adjacent to the reference angular range at which the object has been first detected, it is determined that a plurality of objects are present. In this case, when each distance can be measured, the moving directions can be individually determined based on the measured distances. In addition, when a plurality of objects are detected, determination of the moving direction and identification of a person, which will be described in a third embodiment, may not be necessarily performed.

Further, at least three reference objects 40 adjacent to each other may be disposed to determine the presence or absence of an object between the laser distance measuring device 1 and the reference objects 40. When it is determined that an object is present between the laser distance measuring device 1 and the center reference object 40 and an object is not present between the laser distance measuring device 1 and the other reference objects 40, the size of the object can be determined based on the size of the reference objects 40.

Third Embodiment

The following description will be given of a third embodiment. A laser distance measuring device 1 according to the present embodiment has a configuration which is basically the same as that of the first embodiment. As with the first embodiment, the laser distance measuring device 1 detects the presence or absence of an object based on whether or not a reference object 40 provided at a predetermined reference angular range is detected. The present embodiment includes a basic identification mode obtained by extending the object detection according to the first embodiment and a modified identification mode obtained by extending the moving direction determination according to the second embodiment for identifying whether or not the detected object is a person.

Figure 14:
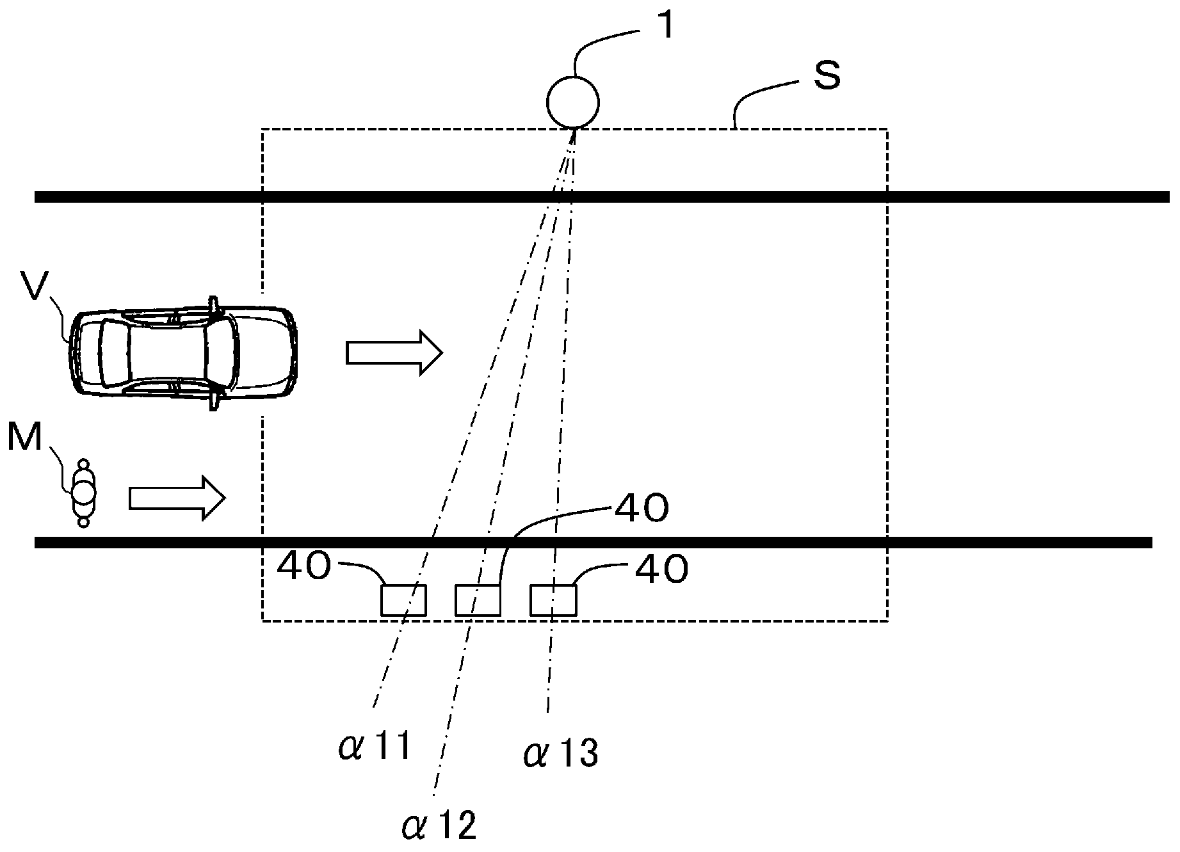
FIG. 14 is a diagram schematically illustrating installation of a laser distance measuring device according to a third embodiment.

As shown in FIG. 14, the target space (S) in the present embodiment is assumed to be, for example, a railroad crossing, in which a person and a vehicle, which is an object other than a person, are present. In the target space, at least three reference objects 40 are provided. According to the present embodiment, the reference objects 40 are provided at the reference angular ranges of $\alpha$11, $\alpha$12, and $\alpha$13, respectively.

Each reference object 40 can be provided for each reference angular range. Alternatively, it is possible to provide one reference object 40 having a size capable of logically setting a plurality of reference angular ranges as described in the first embodiment, or both the one having a size capable of setting one reference angular range and the one having a size capable of setting a plurality of reference angular ranges.

Further, the reference objects 40 are provided with predetermined sizes and intervals as viewed from the laser distance measuring device 1. The term "as viewed from the laser distance measuring device 1" means that the reference objects 40 are located at positions at which the widths described later are ensured since the apparent sizes of the reference objects 40 as viewed from the laser distance measuring device 1 vary depending on the distance from the laser distance measuring device 1.

Figure 15:
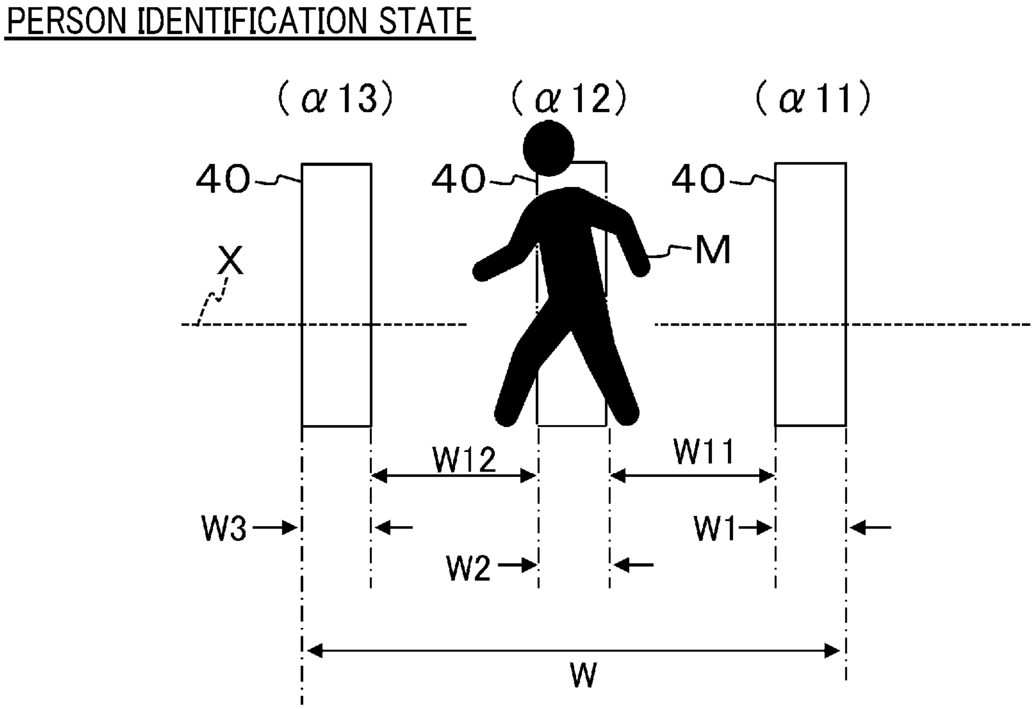
FIG. 15 is a diagram schematically illustrating an example setting of a reference object and a reference angular range.
Figure 15:
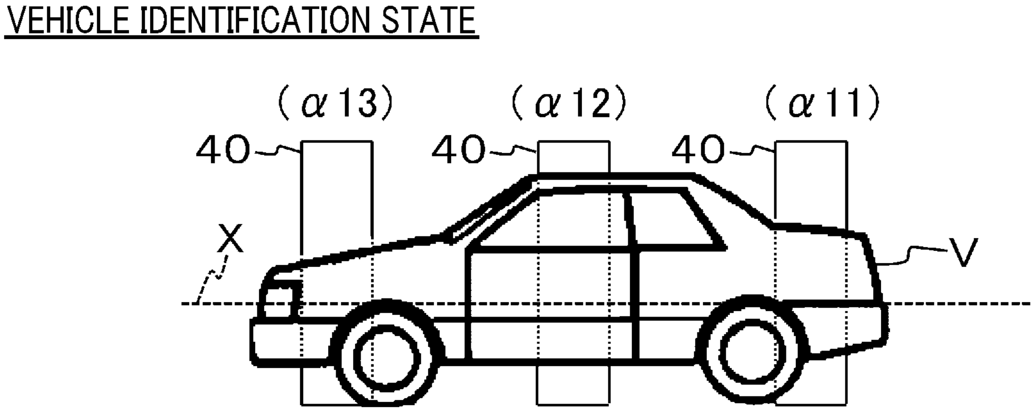

Specifically, FIG. 15 shows a person identification state, in which the reference object 40 corresponding to a position of $\alpha$11 has a width W1, the reference object 40 corresponding to a position of $\alpha$12 has a width of W2, and the reference object 40 corresponding to a position of $\alpha$13 has a width of W3. In this case, the width W2 of the center reference object 40 is approximately the width of, for example, a standard torso of a person, that is, approximately 40 cm for identifying a person. Although the widths of the other reference objects 40 are not specifically limited, the widths W1 and W3 are smaller than the width W2 in the present embodiment.

Further, widths between the reference object 40 and the adjacent reference objects 40 are defined as W11 and W12, respectively. The widths W11 and W12 are larger than the width W2. In other words, the widths are set such that a plurality of reference objects 40 are not simultaneously covered by a person.

Hereinafter, the reference object 40 formed in a size capable of identifying a person and provided with widths between itself and the adjacent reference objects 40 on both sides such that the widths are not simultaneously covered by a person is referred to as an identification reference object 40 for convenience of description.

Further, a width W between the reference object 40 at the position of $\alpha$11 and the reference object 40 at the position of $\alpha$13 is defined as W. This enables identification of a vehicle as shown in FIG. 15 as a vehicle identification state. Accordingly, the width W is set to be smaller than the entire length of a typical vehicle, in other words, such that all the reference objects 40 may be simultaneously covered by a vehicle.

Figure 16:
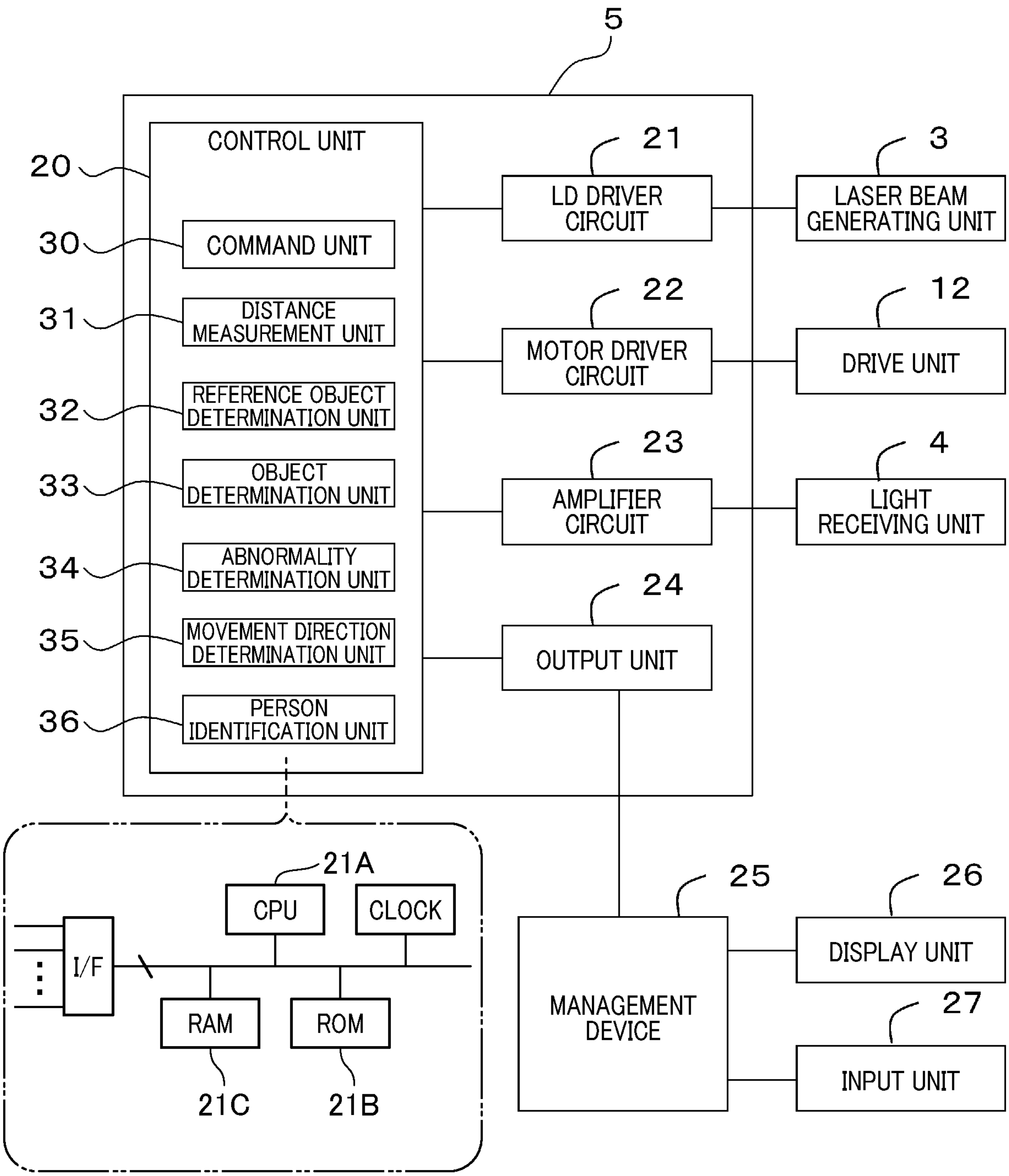
FIG. 16 is a diagram schematically illustrating an electric configuration of a laser distance measuring device.

As shown in FIG. 16, the laser distance measuring device 1 includes a person identification unit 36. The person identification unit 36 is functionally implemented as software by the control unit 20, practically the CPU 21A, executing the programs. When it is determined that an object is present, the person identification unit 36 identifies whether the object is a person or not based on the presence or absence of the object between the reference objects 40 adjacent to each other.

<Example of Basic Identification Mode>

Figure 17:
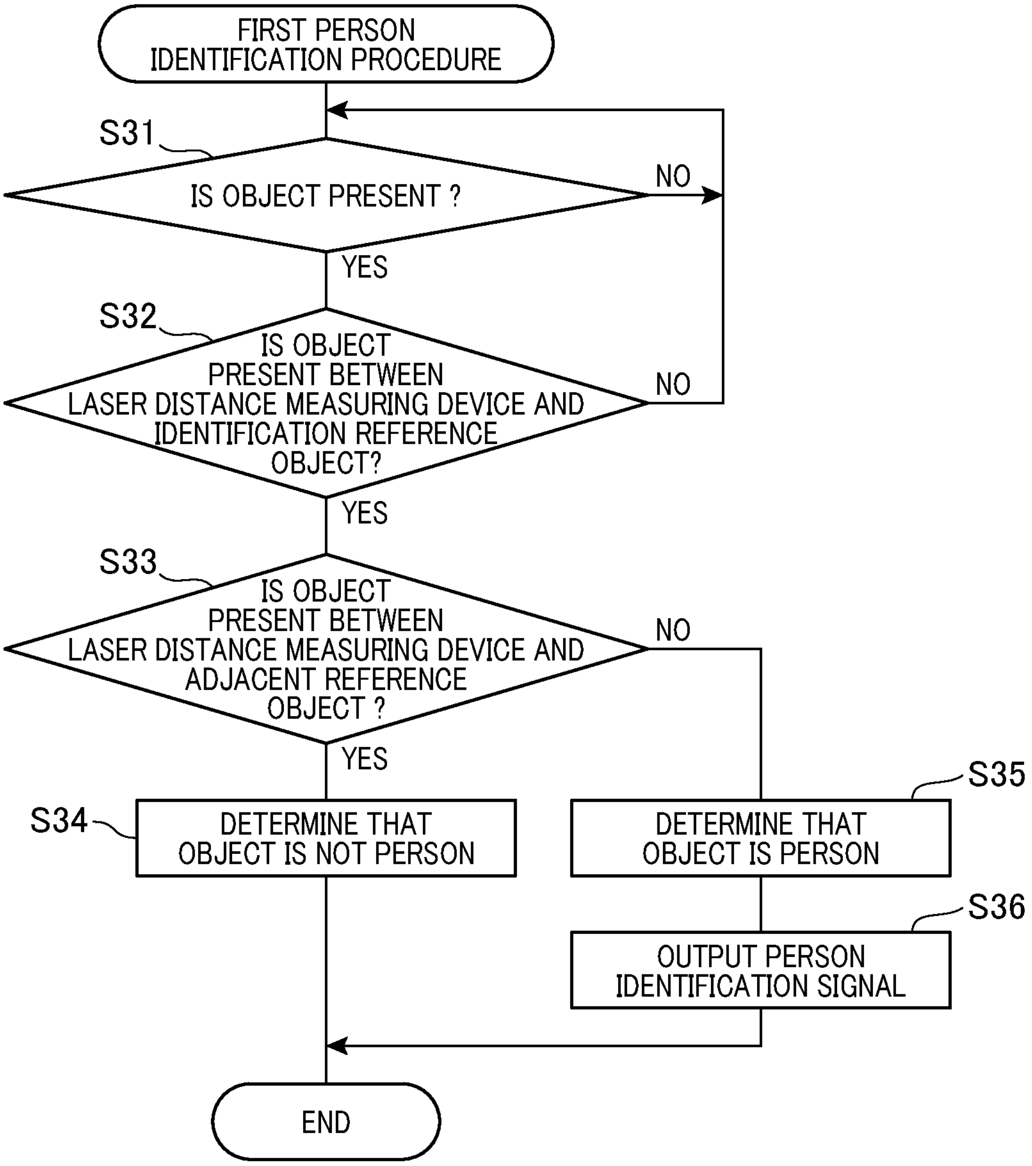
FIG. 17 is a flowchart of a first example person identification.

The following description will be given of an example of a basic identification mode. In an example of a basic identification mode, the laser distance measuring device 1 performs first example person identification shown in FIG. 17. For simplicity of description, FIG. 17 omits the procedure up to determination of the presence or absence of an object, but the presence or absence of an object can be determined in the same flow as that in the object detection shown in FIG. 7. Therefore, the first example person identification can also be implemented as a subroutine that is called when the result of step S3 in the object detection shown in FIG. 7 is NO, or when an object detection signal is outputted in step S4.

In step S31, when it is determined that an object is present (YES in step S31), the laser distance measuring device 1 determines whether the object is present between the laser distance measuring device 1 and the identification reference object 40 in step S32. When the laser distance measuring device 1 determines that the object is not present between the laser distance measuring device 1 and the identification reference object 40 (NO in step S32), the process returns to step S31, and determination is repeated.

On the other hand, when the laser distance measuring device 1 determines that the object is present between the laser distance measuring device 1 and the identification reference object 40 (YES in step S32), it determines whether the object is detected between the identification reference object 40 and other reference objects 40 adjacent thereto in step S33. This is because, as shown in FIG. 15, even when an object is detected between the laser distance measuring device 1 and the identification reference object 40, it is determined that the object is not a person when the object is detected between the reference objects 40 adjacent to each other.

Therefore, when the object is detected between the identification reference object 40 and other reference objects 40 adjacent thereto (YES in step S33), the laser distance measuring device 1 determines that the detected object is not a person in step S34 and ends the procedure. Although the procedure is described as ended for simplicity of description, the process returns to step S31 in practice, and determination whether or not an object is present is repeated.

On the other hand, when the object is not detected between the identification reference object 40 and other reference objects 40 adjacent thereto (NO in step S33), the laser distance measuring device 1 determines that the detected object is a person in step S35. The laser distance measuring device 1 outputs a person identification signal indicating that a person is identified in step S36, and ends the procedure. Although the procedure is described as ended for simplicity of description, the process returns to step S31 in practice, and determination whether or not an object is present is repeated.

As described above, when it is determined that an object is present, the laser distance measuring device 1 identifies whether the object is a person or not based on the presence or absence of the object between the identification reference object 40 and other reference objects 40 adjacent thereto.

<Example of Modified Identification Mode>

Figure 18:
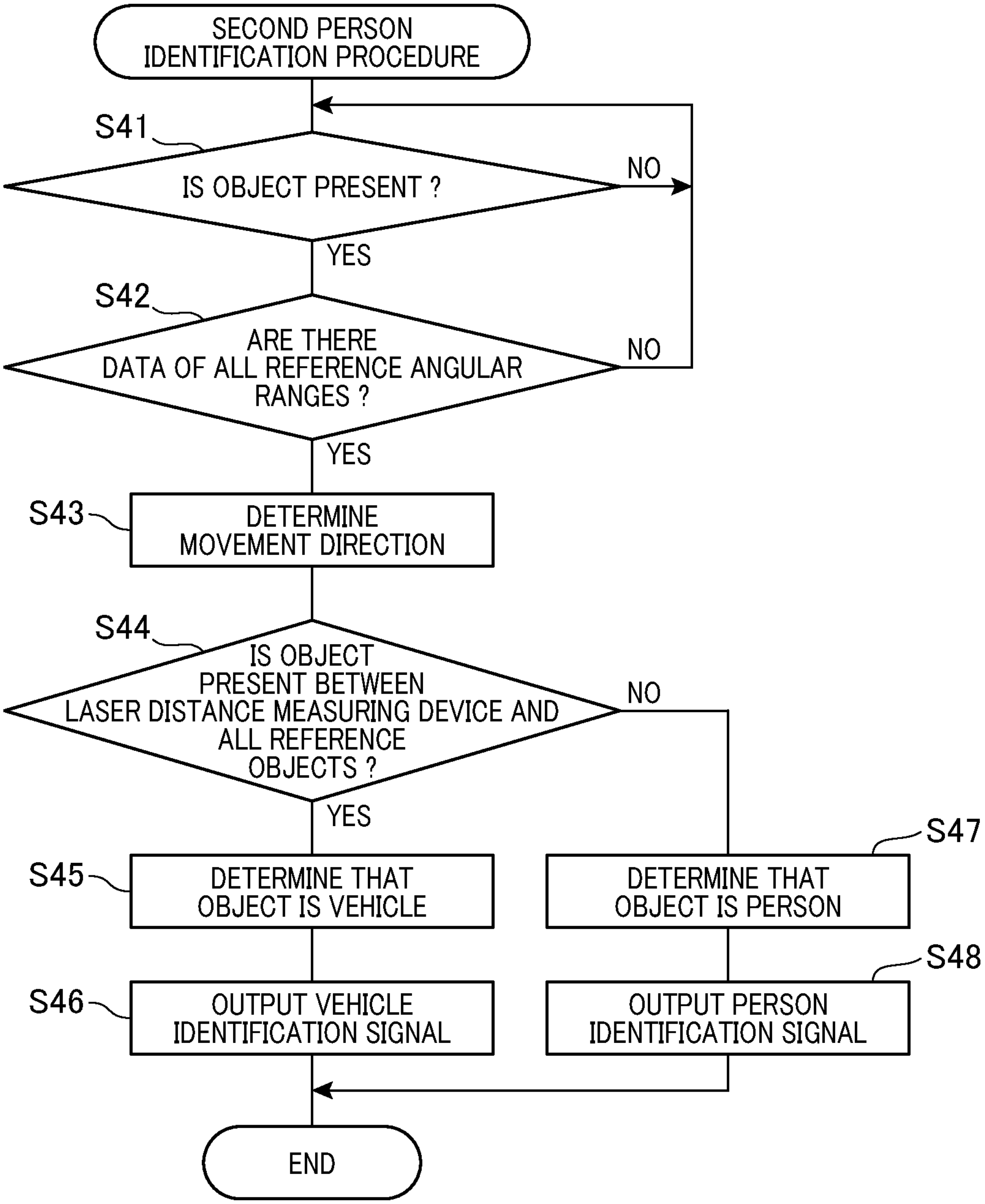
FIG. 18 is a flowchart of a second example person identification.

The following description will be given of an example of a modified identification mode. In an example of a modified identification mode, the laser distance measuring device 1 performs second example person identification shown in FIG. 18. In this example of the modified identification mode, a plurality of times of scans are performed. For simplicity of description, FIG. 18 omits the procedure up to determination of the presence or absence of an object, but the presence or absence of an object can be determined in the same flow as that in the object detection shown in FIG. 7. Therefore, the second example person identification can also be implemented as a subroutine that is called when the result of step S3 in the object detection shown in FIG. 7 is NO, or when an object detection signal is outputted in step S4.

In step S41, the laser distance measuring device 1 determines the presence or absence of an object. When it is determined that no object is present (NO in step S41), determination is repeated. On the other hand, when the laser distance measuring device 1 determines that an object is present (YES in step S41), it determines whether there are data for all the reference angular ranges in step S42. The data are the reference angular range at which the object is determined as being present and the time at which the determination has been first made.

More specifically, in step S42, the laser distance measuring device 1 determines whether the data (in the present embodiment, data for the positions of $\alpha$11, $\alpha$12, and $\alpha$13) are stored in a period of a predetermined movement determination time preceding the current time. For convenience of description, the period of the predetermined movement determination time preceding the current time is hereinafter referred to as a determination period. Further, the movement determination time is set in advance as described in the second embodiment.

Figure 19:
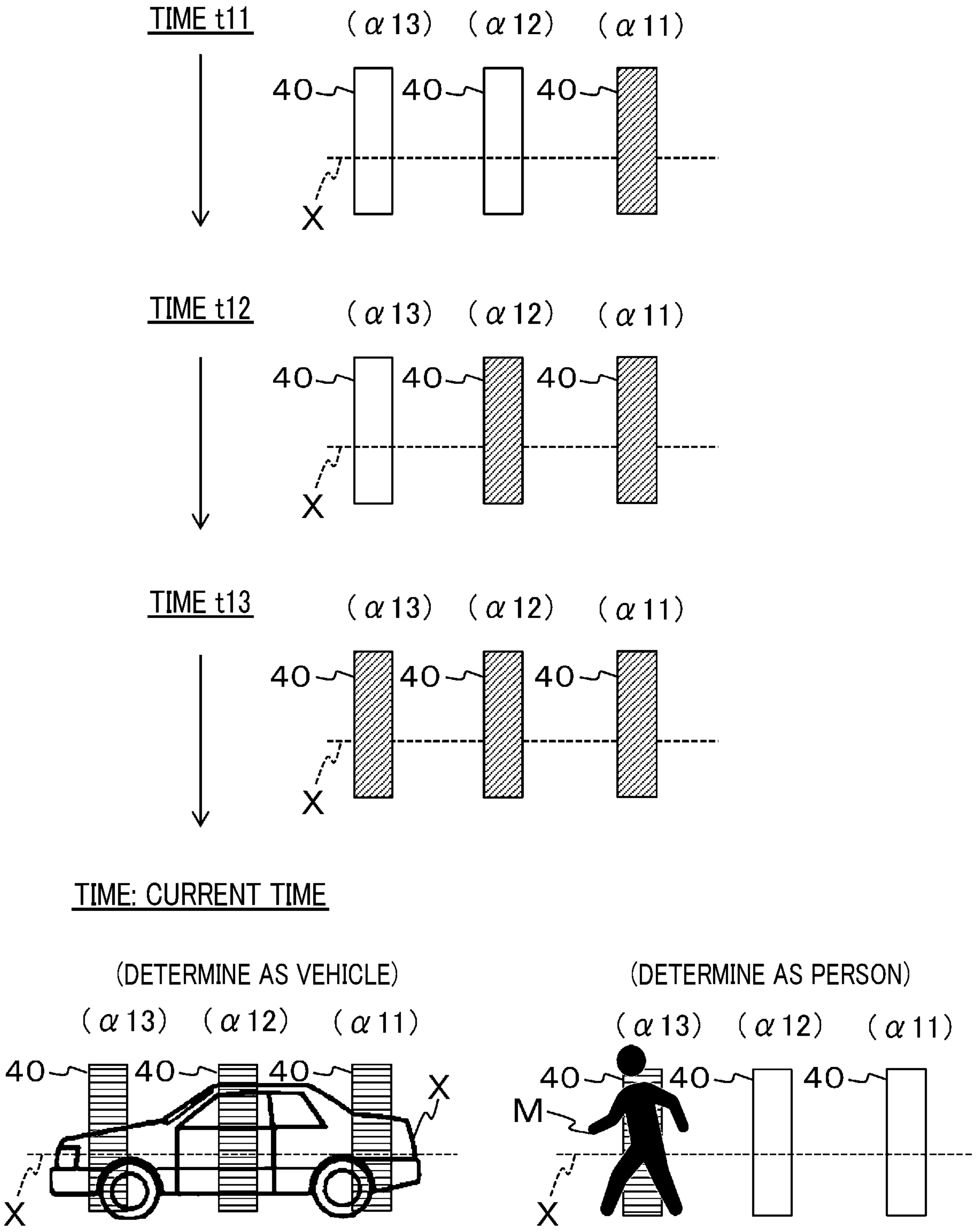
FIG. 19 is a time series view schematically illustrating identification of a person.

For example, as shown in FIG. 19, it is determined that an object is present at the time t11 at the position of the reference angular range $\alpha$11, and is not present at the position of $\alpha$12 and the position of $\alpha$13. In FIG. 19, the reference object 40 provided at the reference angular range at which the object is determined as being present in the determination period is hatched with oblique lines.

In this case, since the laser distance measuring device 1 determines that there is a reference angular range for which no data is stored (NO in step S42), the process returns to step S41, and determination of an object is repeated. Then, at the time t12 shown in FIG. 19, it is determined that an object is present at the position of $\alpha$12, whereas it is determined that an object is not present at the position of $\alpha$13. Accordingly, determination of an object is repeated.

Then, at the time t13, when it is determined that an object is present at the position of $\alpha$13, data are stored for all the reference angular ranges (YES in step S42). Accordingly, the laser distance measuring device 1 determines a moving direction of the object based on the time at which the object has been detected at the respective reference angular ranges. In other words, in step S43, the laser distance measuring device 1 verifies that the detected object is a moving object.

In this case, it is determined that an object is present at the position of $\alpha$11 at the time t11, at the position of $\alpha$12 at the time t12, and at the position of $\alpha$13 at the time t13 in the time series. Accordingly, the laser distance measuring device 1 determines that the object has moved to the left in the figure from $\alpha$11 to $\alpha$13. Then, in step S44, the laser distance measuring device 1 determines whether an object is present between the laser distance measuring device 1 and all the reference objects 40 at the current time, that is, the time t13.

As described above, the respective reference objects 40 are provided with sizes and intervals capable of identifying a person. Further, as described above, the respective reference objects 40 are provided with sizes and intervals capable of identifying a vehicle. Therefore, as shown in FIG. 19, when it is determined that an object is present between the laser distance measuring device 1 and all the reference objects 40 at the current time, it is determined that the object is a vehicle. Further, when it is determined that an object is present between the laser distance measuring device 1 and one reference object 40 at the current time, it is determined that the object is a person. Further, in FIG. 19, the reference object 40 provided at the reference angular range at which the object is determined as being present at the current time is hatched with horizontal lines.

Therefore, when it is determined that an object is present between the laser distance measuring device 1 and all the reference objects 40 (YES in step S44), the laser distance measuring device 1 determines that the object is a vehicle in step S45, and outputs a vehicle identification signal indicating that a vehicle has been identified in step S46.

On the other hand, when it is determined that an object is present between the laser distance measuring device 1 and one reference object 40 (NO in step S44), the laser distance measuring device 1 determines that the object is a person in step S47, and outputs a person identification signal indicating that a person has been identified in step S48.

As described above, when it is determined that an object is present, the laser distance measuring device 1 identifies whether the object is a person or a vehicle based on the presence or absence of the object between the reference objects 40 adjacent to each other. According to the laser distance measuring device 1 described above, the following effects can be achieved.

The laser distance measuring device 1 measures a distance to an object which is present in a target space and a direction of the object based on the time elapsed from when a laser beam is generated to when the reflected light 7 is received. In addition, the laser distance measuring device 1 determines the presence or absence of the reference object 40 at a predetermined position in the target space based on the measurement result. The laser distance measuring device 1 determines whether the reference object 40 provided at a predetermined position can be detected based on the determination result. The laser distance measuring device 1 further determines the presence or absence of the object between the laser distance measuring device and each of the plurality of the reference objects 40 based on the determination result, and identifies whether the object is a person or not based on the presence or absence of the object between the reference objects 40 adjacent to each other.

With this configuration, the laser distance measuring device 1 enables detection of an object which is difficult to be detected, and determination of the moving direction of the object. In addition, the laser distance measuring device 1 enables detection of a person or a vehicle entering a range where entry is prohibited, for example.

Further, the laser distance measuring device 1 determines the presence or absence of an object between the laser distance measuring device 1 and at least three reference objects 40 provided adjacent to each other. With this configuration, for example, when it is determined that an object is present between the laser distance measuring device 1 and the center reference object 40, and an object is not present between the laser distance measuring device 1 and the other reference objects 40, the size of the object can be determined based on the size of the reference objects 40.

Further, at least one of the plurality of reference objects 40, which are disposed adjacent to each other, has a width smaller than that of a torso of a person, the reference objects 40 being arranged with a distance therebetween larger than that of a torso of a person, and the laser distance measuring device determines presence or absence of an object between the plurality of reference objects 40 adjacent to each other. Accordingly, the laser distance measuring device can determine that the detected object is a person or not.

Further, the first example person identification and the second example person identification can be combined with the abnormality determination described in the first embodiment. For example, while a person or a vehicle has been identified, there may be a case where the person or the vehicle does not move even after the abnormality determination time elapses. In this case, the laser distance measuring device can detect an abnormality such as being stuck, and can output an abnormality detection signal for notifying the abnormality, in this case, a danger.

Further, in an example described in the above embodiment, the width W of the reference object 40 is capable of identifying a vehicle. However, the reference object 40 may have a size capable of identifying a bicycle or a motorcycle. With this configuration, a bicycle, a motorcycle, or the like which is not large as a vehicle can be identified. Further, it is also possible to individually provide the reference object 40 for identifying a person, the reference object 40 for identifying a vehicle, and the reference object 40 for identifying a bicycle or a motorcycle in the target space.

Other Embodiments

Figure 20:
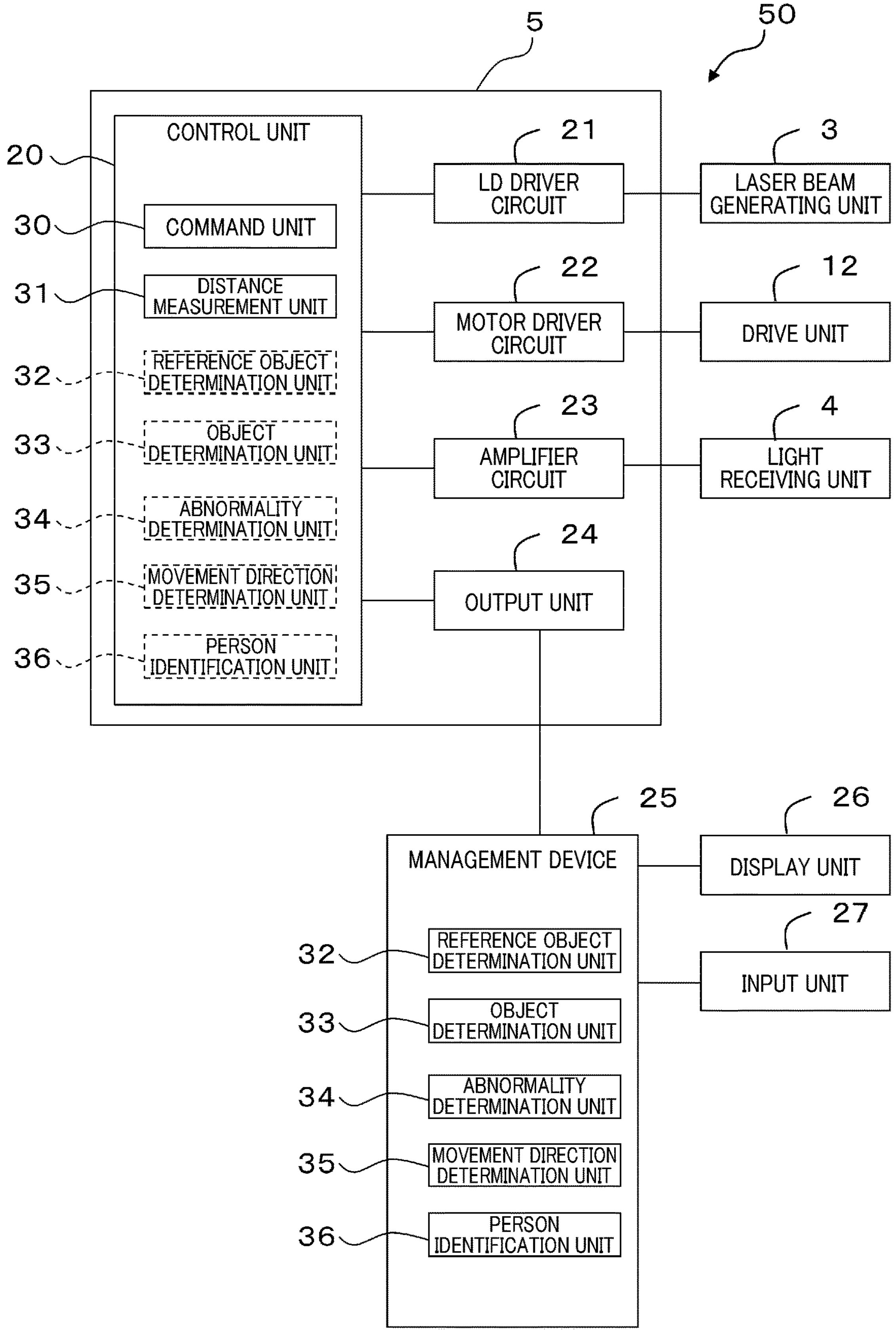
FIG. 20 is a diagram schematically illustrating a configuration example of a detection system according to another embodiment.

In the above embodiments, the laser distance measuring device 1 includes the determination unit, the identification unit, and the like. However, as shown in FIG. 20, for example, all or part of the reference object determination unit 32, the object determination unit 33, the abnormality determination unit 34, the moving direction determination unit 35, the person identification unit 36 may be provided in a management device 25, or may be provided in both the laser distance measuring device 1 and the management device 25.

According to an object detection system 50 composed of the laser distance measuring device 1 and the management device 25 as well, the same effects as those of the laser distance measuring device 1 described in the above embodiments, such as detection of an object which is difficult to be detected, can be achieved. Further, when implemented as application software of the management device 25, the respective functions described in the above embodiments can be easily applied to the existing laser distance measuring device 1.

In the above embodiments, the reference angular range is described as a fixed value. However, when the distance to the object can be detected, the reference angular range may be changed according to the distance to the object. For example, when the distance to the detected object is relatively large, the scan angle included in the reference angular range can be increased, and when the distance is relatively small, the scan angle included in the reference angular range can be decreased. Accordingly, when a relative size as viewed from the laser distance measuring device 1 varies depending on the distance, the accuracy in detection and identification of the object can be improved.

It is also possible to provide a configuration in which data other than the reference angular range are referred to. That is, when a plurality of reference objects 40 are provided adjacent to each other at predetermined intervals in the target space, and it is determined that an object is present between the laser distance measuring device 1 and the plurality of reference objects 40, it is possible to identify whether the object is a plurality of persons or a person and an object other than a person based on the detection result for the object other than between the laser distance measuring device 1 and the reference object 40. This identification can be performed by the object determination unit 33 or the person identification unit 36.

For example, since the laser beam is scattered by the clothes, a person can be detected outside the reference angular range as long as it is within the target space. Therefore, it is also possible to provide a configuration in which a moving locus of an object detected outside the reference angular range is stored, and, when a plurality of persons enter the reference angular range at the same time, determination of the moving direction and identification of whether the object is a person or not can be performed taking into account the data of the moving locus. Accordingly, in a situation in which a plurality of objects are assumed to be present, it is possible to determine whether a plurality of persons are detected or a person and an object other than a person, for example, a vehicle are detected.

REFERENCE SIGNS LIST

In the drawings, reference numeral 1 denotes a laser distance measuring device, reference numeral 3 denotes a laser beam generating unit, reference numeral 4 denotes a light receiving unit, reference numeral 11 denotes a rotating mirror (reflection unit), reference numeral 12 denotes a drive unit, reference numeral 31 denotes a distance measurement unit, reference numeral 32 denotes a reference object determination unit, reference numeral 33 denotes an object determination unit, reference numeral 34 denotes an abnormality determination unit, reference numeral 35 denotes a moving direction determination unit, reference numeral 36 denotes a person identification unit, reference numeral 40 denotes a reference object, and reference numeral 50 denotes an object detection system.

What is claimed is:

1. A system for detecting an object, the system comprising:

a laser distance measuring device configured to generate a laser beam into a detection range and receive the laser beam reflected from the detection range; and a plurality of reference objects provided in the detection range, each of the reference objects (i) extending longitudinally upward relative to and vertically above a ground surface, (ii) being positioned fixedly at a known position in a target space which is set within the detection range such that the reference objects are positionally opposed to the laser distance measuring device, (iii) having a reflection surface which reflects the laser beam back to the laser distance measuring device when there is no object between the laser distance measuring device and each of the reference objects in a reference angular range previously positionally set in the target space, the reference angular ranges corresponding to scan angles along each of which the laser beam is scanned toward the reference objects, and (iv) at least three of the reference objects are disposed adjacent to each other, at least one of the at least three reference objects having a width smaller than a size of a torso of a person, the reference objects being arranged with a distance provided therebetween which is larger than the size of the torso of the person, and wherein the laser distance measuring device comprises:

a laser beam generating unit configured to, every scan angle, generate the laser beam;

a reflection unit configured to, every scan angle, reflect the laser beam generated by the laser beam generating unit toward the detection range;

a drive unit configured to, at each of the scan angles, drive the reflection unit to change a reflection direction of the reflected laser beam to scan the detection range spatially including the target space;

a light receiving unit configured to, every scan angle, receive the laser beam reflected from the detection range; and a control unit configured to:

i) measure a distance to any object which is present in the target space based on a time elapsed from a timing when the laser beam is generated by the laser beam generating unit to a timing when the laser beam reflected from the detection range is received by the light receiving unit;

ii) determine whether the reference objects are detected or not in the respective reference angular ranges based on the measured distance; and iii) determine (i) that the object is present between the laser distance measuring device and the respective reference objects in the respective reference angular ranges when it is determined that the reference object is not detected and (ii) that the object is not present between the laser distance measuring device and the respective reference objects in the respective reference angular ranges when it is determined that the reference objects are detected.

2. The system according to claim 1, wherein the control unit is configured to determine a moving direction of the object based on a determination result of the object determination based on an order in which presence of the object has been determined.

3. The system according to claim 1, wherein the control unit is configured to identify a person which serves as the object, based on a determination result by the object determination, when it is determined that the reference objects are not detected at the known position in the respective reference angular ranges.

4. The system according to claim 1, wherein the control unit is configured to determine presence or absence of abnormality based on a determination result by the object determination, wherein the control unit determines that there is an abnormality when presence of the object is continuously determined for a period of time exceeding a predetermined abnormality determination time.

5. The system according to claim 1, wherein the plurality of the reference objects are provided adjacent to each other at a predetermined interval therebetween in the target space, and when it is determined that the object is present between the laser distance measuring device and the plurality of the reference objects, the control unit is configured to further identify whether the object is a plurality of persons or a single person and an object other than the person based on a detection result for an object other than between the laser distance measuring device and the reference objects.

6. The system according to claim 1, wherein the reference objects extend vertically upward from the ground surface.

7. The system according to claim 1, wherein the reflection surfaces of the reference objects are located on wall surfaces located above the ground surface.

* * * * *